(12) United States Patent
Tomura et al.

(10) Patent No.: US 11,502,624 B2
(45) Date of Patent: Nov. 15, 2022

(54) VIBRATION TYPE ACTUATOR, ROTATIONALLY DRIVING APPARATUS, AND IMAGE PICKUP APPARATUS

(71) Applicant: CANON KABUSHIKI KAISHA, Tokyo (JP)

(72) Inventors: Kaori Tomura, Tokyo (JP); Ayumu Nemoto, Tokyo (JP); Yasufumi Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/445,854

(22) Filed: Aug. 25, 2021

(65) Prior Publication Data

US 2022/0069739 A1 Mar. 3, 2022

(30) Foreign Application Priority Data

Aug. 31, 2020 (JP) .............................. JP2020-145156
Mar. 24, 2021 (JP) .............................. JP2021-049358
Jul. 6, 2021 (JP) .............................. JP2021-111913

(51) Int. Cl.
  *H04N 5/225* (2006.01)
  *H02N 2/02* (2006.01)
  *H02N 2/00* (2006.01)

(52) U.S. Cl.
  CPC .......... *H02N 2/026* (2013.01); *H02N 2/0065* (2013.01); *H04N 5/2251* (2013.01); *H04N 5/2259* (2013.01)

(58) Field of Classification Search
  CPC .... H04N 5/2251; H04N 5/2259; H02N 2/026; H02N 2/0065; H02N 2/001; H02N 2/103; H02N 2/12; H02N 2/14; F16M 7/00; G03B 17/561; G02B 7/04
  See application file for complete search history.

(56) References Cited

U.S. PATENT DOCUMENTS

2019/0222147 A1* 7/2019 Osawa ................... H02N 2/001

FOREIGN PATENT DOCUMENTS

| CN | 101694975 B | | 5/2012 |
|---|---|---|---|
| CN | 203406797 U | * | 1/2014 |
| CN | 203406797 U | | 1/2014 |
| JP | 2005-164369 A | | 6/2005 |
| JP | 2006-158054 A | | 6/2006 |
| JP | 2019-126211 A | | 7/2019 |

OTHER PUBLICATIONS

The above Foreign Patent Documents were cited in the Jan. 28, 2022 British Office Action, which is enclosed, that issued in British Patent Application No. 2112137.1.

* cited by examiner

*Primary Examiner* — Nelson D. Hernández Hernández
(74) *Attorney, Agent, or Firm* — Cowan, Liebowitz & Latman, P.C.

(57) ABSTRACT

A vibration type actuator includes a vibrator, including a protrusion and a piezoelectric element, that is arranged to vibrate in response to a voltage, and a contact member having a contact surface which the protrusion contacts. The vibrator and the contact member rotate relative to each other around a first axis. The vibrator is tilted to the contact surface by a predetermined angle.

16 Claims, 19 Drawing Sheets

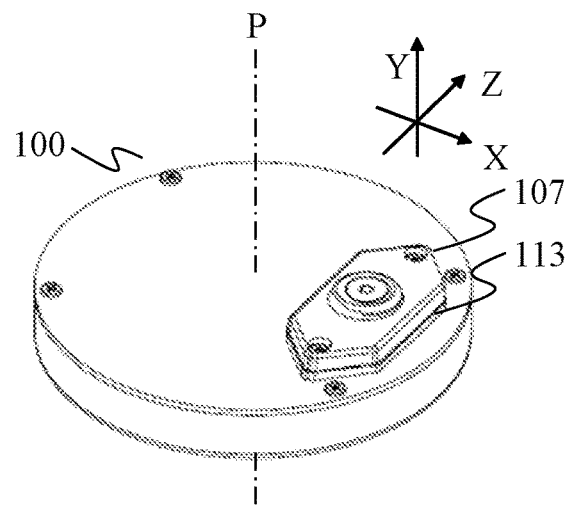
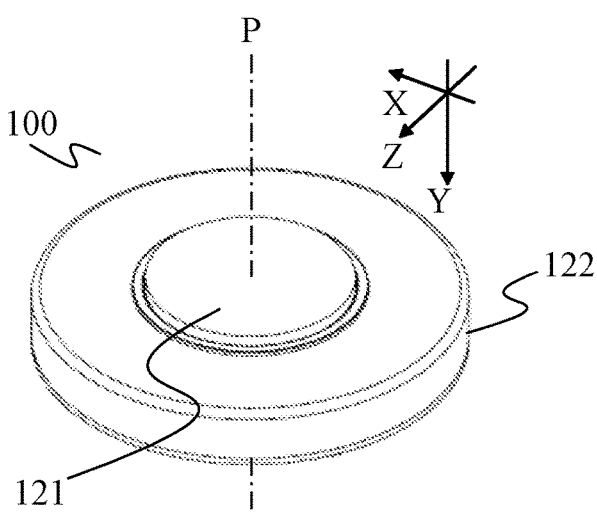
FIG. 2A          FIG. 2B
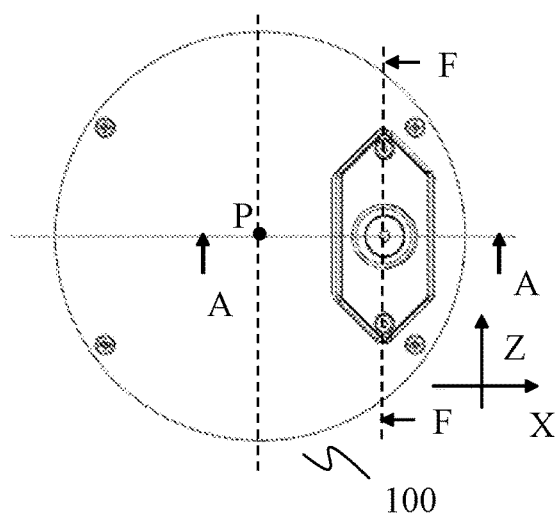
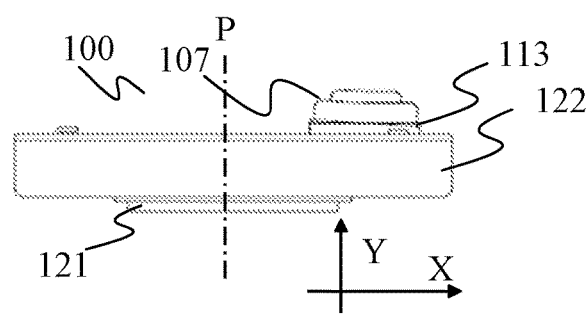
FIG. 2C          FIG. 2D

PRIOR ART

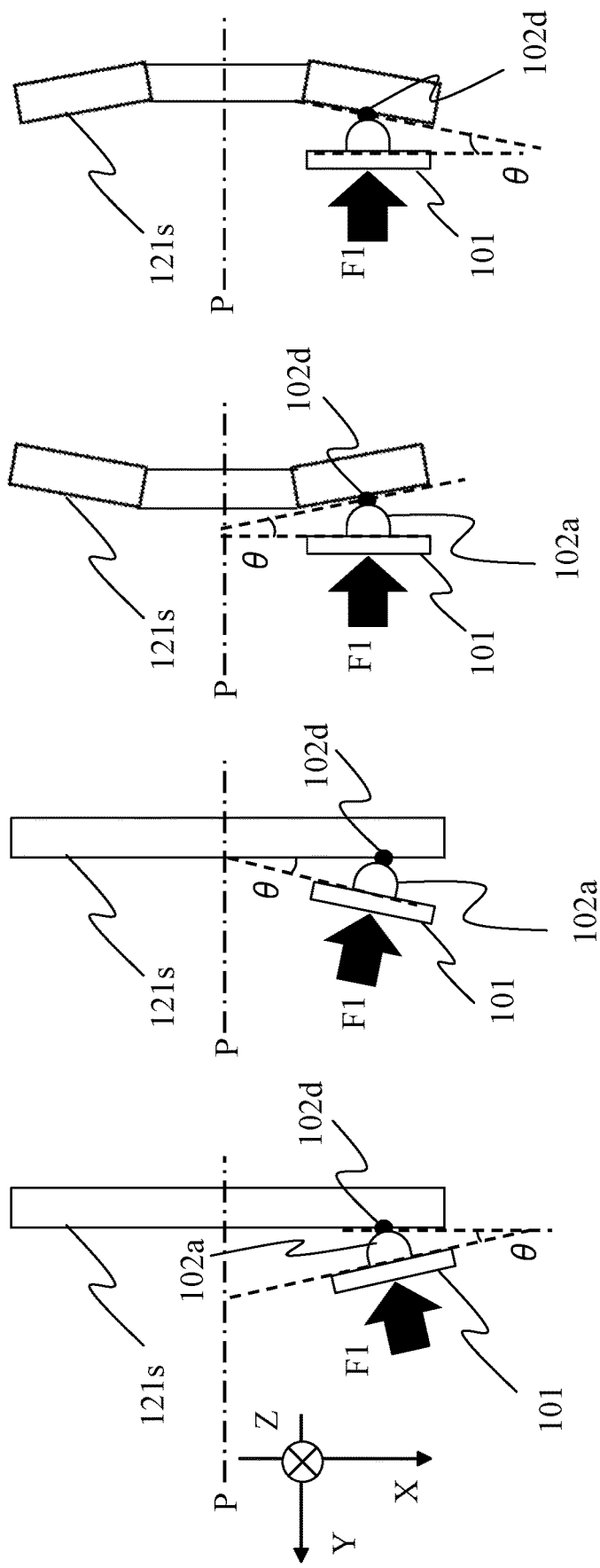

VIBRATION TYPE ACTUATOR, ROTATIONALLY DRIVING APPARATUS, AND IMAGE PICKUP APPARATUS

BACKGROUND OF THE INVENTION

Field of the Invention

The present invention relates to a vibration type actuator used for a rotationally driving apparatus and the like.

Description of the Related Art

Japanese Patent Laid-Open No. ("JP") 2006-158054 discloses a rotationally driving apparatus using a vibration type actuator that excites vibrations to a vibrator (vibration member) using a piezoelectric element and rotationally drives a driven member that contacts the vibrator. The rotationally driving apparatus disclosed in JP 2006-158054 brings the vibrator into pressure contact with the driven member from a direction parallel to its rotation center axis, transmits an elliptical motion of a protrusion of the vibrator to the driven member, and thereby rotationally drives the driven member.

However, in the rotationally driving apparatus disclosed JP 2006-158054, the vibrator generates a driving force in a tangential direction of a circle centered on the rotation center axis (or the protrusion elliptically moves in a plane including the direction), whereas the driven member rotates while skidding in a direction different from the driving force generated direction. As a result, the abrasion of the vibrator (protrusion) that is brought into pressure contact with the driven member increases, the life of the rotationally driving apparatus shortens, and abrasion powder is likely to occur.

SUMMARY OF THE INVENTION

The present invention provides a vibration type actuator, a rotationally driving apparatus using the same, and the like, each of which can reduce skidding of a driven member relative to a vibrator.

A vibration type actuator according to one aspect of the present invention includes a vibrator, including a protrusion and a piezoelectric element, that is arranged to vibrate in response to a voltage, and a contact member having a contact surface which the protrusion contacts. The vibrator and the contact member rotate relative to each other around a first axis. The vibrator is tilted to the contact surface by a predetermined angle. A rotationally driving apparatus and an image pickup apparatus having the above vibration type actuator also constitute another aspect of the present invention.

Further features of the present invention will become apparent from the following description of exemplary embodiments with reference to the attached drawings.

BRIEF DESCRIPTION OF THE DRAWINGS

FIGS. 2A to 2D are perspective views, a plan view, and a side view showing an appearance of the vibration type motor according to the first embodiment.

FIGS. 7A to 7D illustrate a relationship between a vibrator and a contact surface (friction surface) in the first embodiment.

DESCRIPTION OF THE EMBODIMENTS

Referring now to the accompanying drawings, a description will be given of embodiments according to the present invention.

First Embodiment

Figure 1:
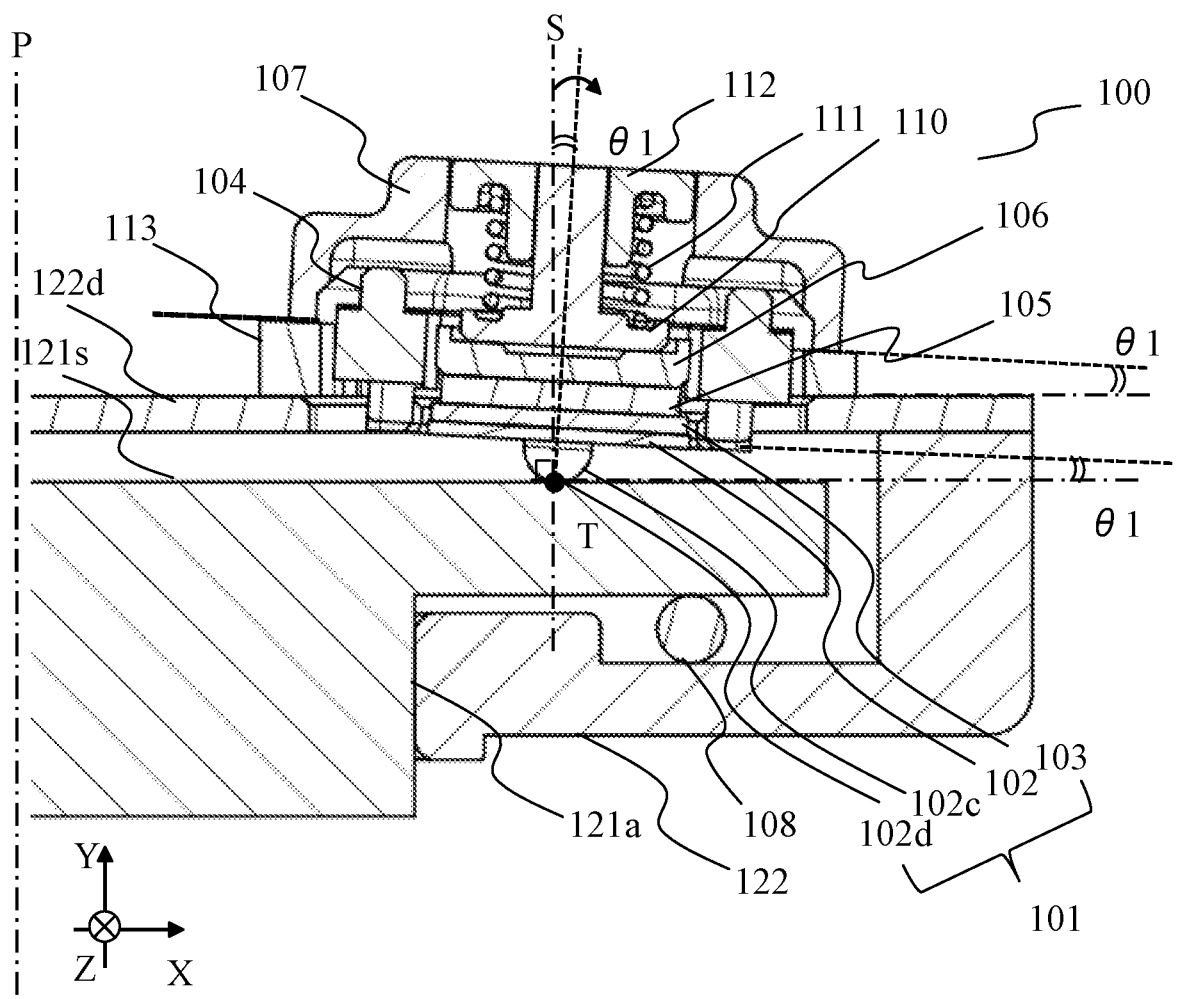
FIG. 1 is a sectional view of a vibration type motor according to a first embodiment.
Figure 3A:
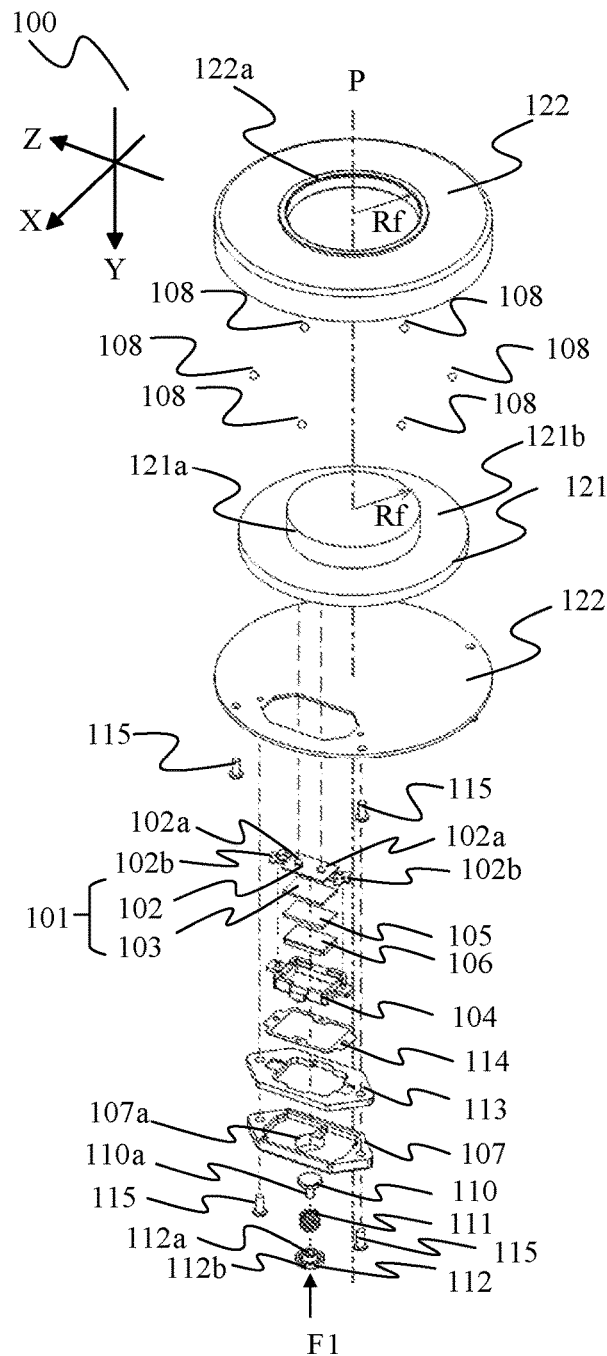
FIGS. 3A and 3B are exploded perspective views of a rotationally driving apparatus using the vibration type motor according to the first embodiment.
Figure 3B:
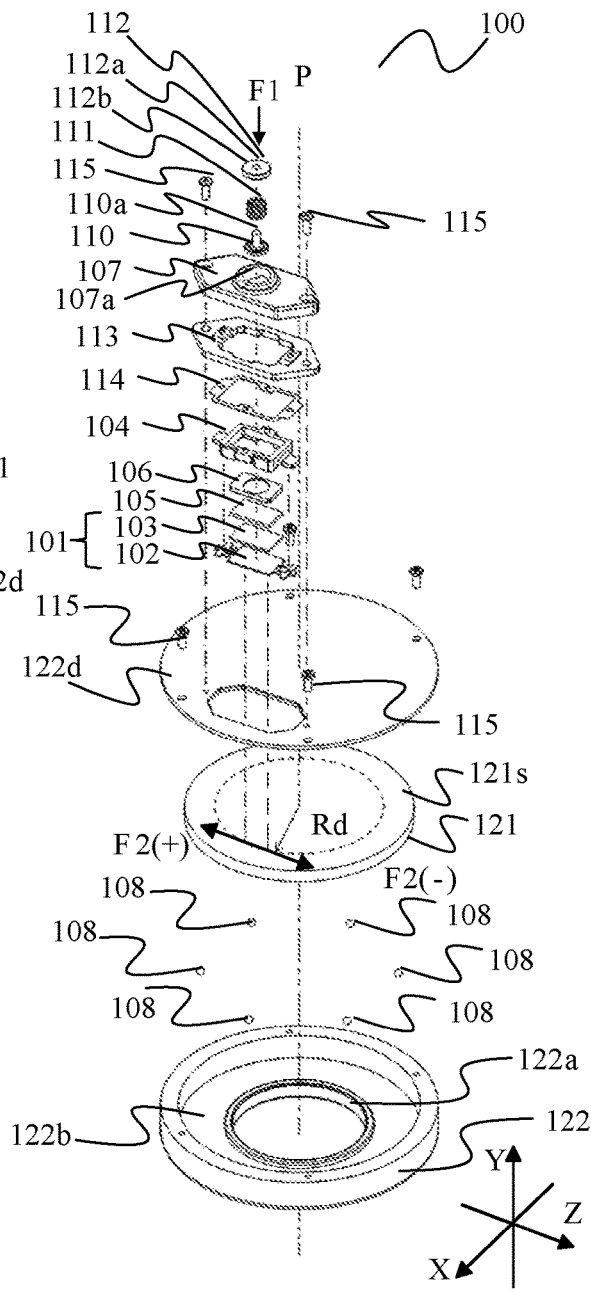

FIGS. 2A to 2D illustrate an appearance of a vibration type motor 100 as the vibration type actuator according to a first embodiment of the present invention. FIG. 2A is a perspective view of the vibration type motor 100 viewed from the front (vibrator unit) side. FIG. 2B is a perspective view of the vibration type motor 100 viewed from the back side. FIG. 2C is a plan view of the vibration type motor 100 viewed from the front side. FIG. 2D is a side view of the vibration type motor 100. FIGS. 3A and 3B illustrate the vibration type motor 100 in an exploded manner. FIG. 1 illustrates a section (XY section) of the vibration type motor 100 taken along a line A-A in FIG. 2C.

The vibration type motor 100 includes a base member 122 as a base, a vibrator unit held by the base member 122, and a friction member 121 as a contact member. The vibrator unit has a vibrator 101 and a pressurizing mechanism. The friction member 121 is rotatable around a rotation center axis (first axis) P, and has a contact surface (friction surface)

121s parallel to a plane orthogonal to the rotation center axis P (inside an XZ plane as the first plane).

In this embodiment, a Y direction is defined as a direction parallel to the rotation center axis P of the friction member 121, a Z direction is defined as a longitudinal direction of the vibrator 101, and an X direction is defined as a direction orthogonal to the Y and Z directions. The axis extending in the Z direction is defined as a Z axis. The contact surfaces 121s of the vibrator unit and the friction member 121 are disposed in the Y direction. A +Y direction is defined as a direction in which the vibrator 101 moves away from the contact surface 121s is, and a −Y direction is defined as a direction in which the vibrator 101 approaches to the friction member 121. In addition, "parallel" and "orthogonal" in this embodiment contain perfect "parallel" and "orthogonal" and allow a margin for a manufacturing error of the vibration type motor and mechanical backlash, which can be considered "parallel" and "orthogonal."

The vibrator 101 includes an elastic member 102 and a piezoelectric element 103. The piezoelectric element 103 is PZT (lead zirconate titanate) or the like, and the elastic member 102 is formed as a stainless-steel plate or the like. The elastic member 102 has two protrusions 102a and two held members 102b in the Z direction. Tips of the two protrusions 102a have hemispheres (curved surfaces) 102c. The elastic member 102 and the piezoelectric element 103 are fixed by an adhesive. The friction member 121 is a disc-shaped member centered on the rotation center axis P of the vibration type motor 100, and has a contact surface 121s on its surface. The vibrator 101 is pressurized in the −Y direction by the pressurizing mechanism, whereby the hemisphere 102c of each protrusion 102a is brought into pressure contact with a contact point (contact position or portion) 102d on the contact surface 121s of the friction member 121.

The friction member 121 has a shaft member 121a that is rotatably inserted into and held in a rotation support hole 122a provided in the base member 122. Rolling balls 108 are disposed at a plurality of locations in the circumferential direction of the vibration type motor 100 between a roll receiver 121b provided on the friction member 121 and a roll receiver 122b provided on the base member 122.

The elastic member 102 is integrated with a first holding member 104 because the held member 102b is held by the first holding member 104. The first holding member 104 is held by a frame member 113 via an elastic connecting member 114. The frame member 113 is fixed to a chassis 122d fixed onto the base member 122 with screws 115. Thereby, the elastic member and the first holding member 104 are positioned and fixed relative to the friction member 121.

The vibration type motor 100 includes a blocking member 105. The blocking member 105 is a member that restrains the vibration of the piezoelectric element 103 from propagating to a small base 106, which will be described later. The blocking member 105 is made of felt cloth or the like.

The small base 106 is a pressure transmitting member that surface-contacts the piezoelectric element 103 via the blocking member 105 and transmits the pressure from the pressurizing mechanism (pressurizing member 110 described later) to the vibrator 101. The pressurizing mechanism is held by the second holding member 107. The second holding member 107 is fixed to the chassis 122d by the screws 115 together with the frame member 113 described above.

The pressurizing mechanism includes a pressurizing member 110, a pressure spring 111, and a pressure receiving member 112. The pressurizing member (movable member) 110 is held by the pressure receiving member 112 and movable only in the Y direction when a fitting shaft member 110a is fit into the fitting hole 112a in the pressure receiving member 112. The pressure receiving member 112 is fixed to the second holding member 107 when a screw member 112b formed on the outer peripheral surface of the pressure receiving member 112 is fastened into a screw hole member 107a of the second holding member 107.

The pressure spring 111 is a compression coil spring, one end of which is fixed to the pressure receiving member 112 and the other end of which contacts the pressurizing member 110. The pressurizing member 110 transmits the pressure from the pressure spring 111 disposed between the pressurizing member 110 and the pressure receiving member 112 to the small base 106. The small base 106 transmits a pressure F1 to the vibrator 101 via the blocking member 105, and brings the vibrator 101 into pressure contact with the friction member 121. Setting a position where the pressure F1 is applied to the vibrator 100 from the pressurizing mechanism to a position near the middle of the positions of the two protrusions 102a of the elastic member 102 in the Z direction can bring the two protrusions 102a into pressure contact with the friction member 121 in a well-balanced manner.

As illustrated in FIG. 1, this embodiment tilts the vibrator 101 to the contact surface 121s of the friction member 121 by an angle θ1 from the Y direction parallel to the rotation center axis P. The reason for this will be described later.

Figure 4A:
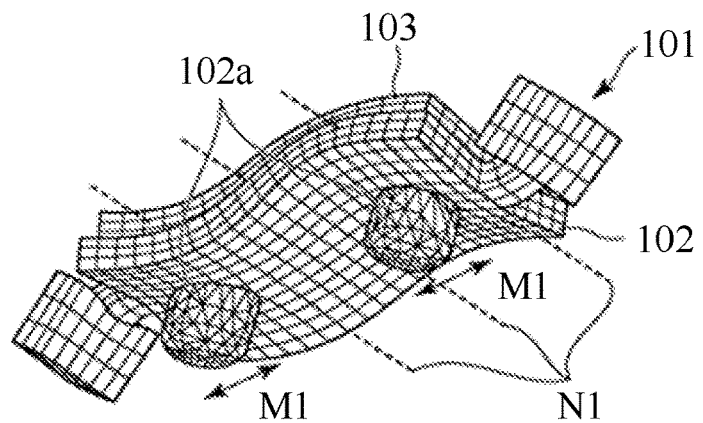
FIGS. 4A to 4C explain a principle of generating a driving force due to a vibration of a vibrator in the first embodiment.
Figure 4B:
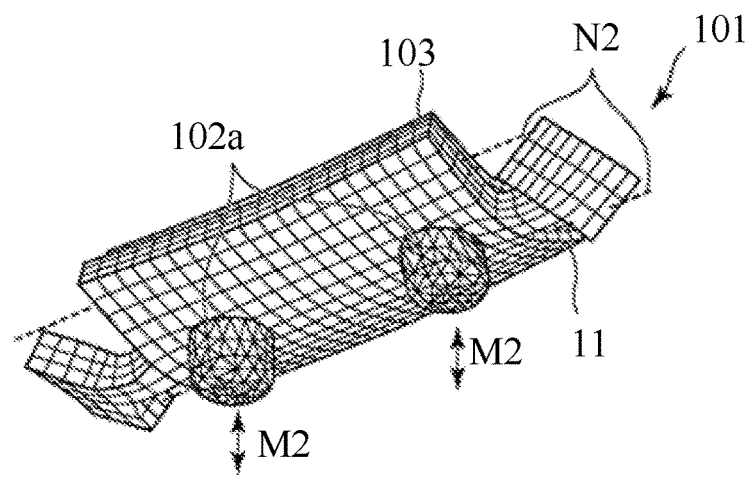
Figure 4C:
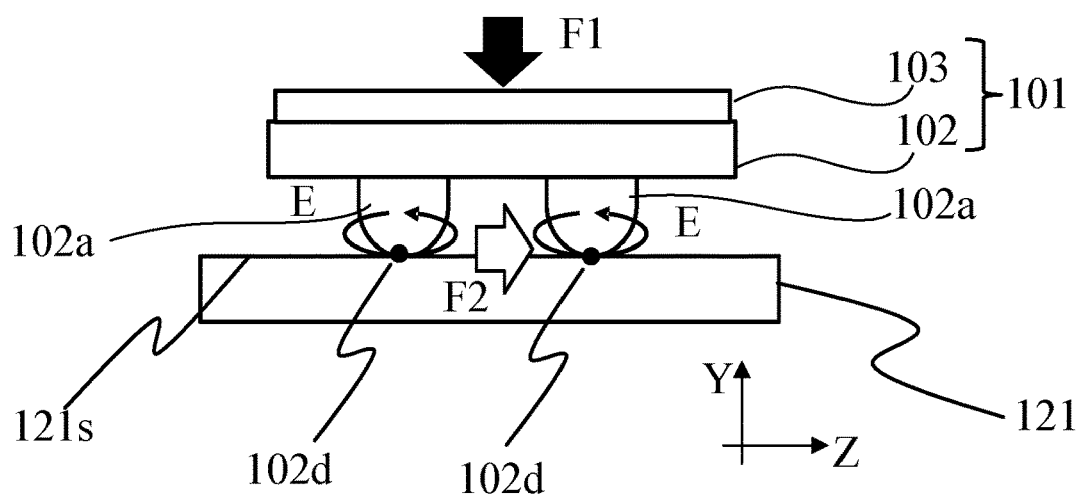

Referring now to FIGS. 4A to 4C, a description will be given of a driving principle of the vibration type motor 100. FIGS. 4A and 4B are schematic views showing the vibration mode of the vibrator 101. FIG. 4C illustrates a simplified section (YZ section) of the vibration type motor 100 taken along a line F-F in FIG. 2C, and is a schematic view of the periphery of the protrusion 102a that provides an elliptical motion indicated by an arrow E described later. When the AC voltage is applied to the piezoelectric element 103, the piezoelectric element 103 expands and contracts, whereas the elastic member 102 is less likely to expand or contract. Thereby, the vibrator 101 in which the piezoelectric element 103 and the elastic member 102 are bonded together provides a bending deformation. Thus, when the high-frequency AC voltage is applied to the piezoelectric element 103, a high-frequency bending vibration mode can be generated in the vibrator 101.

The vibration mode of the vibrator 101 involves a complex vibration that includes a first vibration and a second vibration. As illustrated in FIG. 4A, the first vibration is a vibration that causes a reciprocation M1 indicated by a double-sided arrow in the protrusion 102a of the vibrator 101, and displaces the protrusion 102a mainly in the tangential direction of the contact surface 121s. In the first vibration, a plurality of nodes N1 are generated. The vibrator 101 has three nodes N1 shown by broken lines, and the nodes N1 near both ends in the longitudinal direction of the vibrator 101 are located near the protrusions 102a.

As illustrated in FIG. 4B, the second vibration is a vibration that causes a reciprocation M2 indicated by a double-sided arrow in the protrusion 102a, and displaces the protrusion 102a mainly in a direction of approaching to and separating from the contact surface 121s. In the second vibration, a plurality of nodes N2 are generated. The vibrator 101 has two nodes N2 shown by broken lines.

By generating the first vibration and the second vibration at the same frequency, as illustrated in FIG. 4C, the elliptical motion indicated by the arrow E can be generated at the contact point 102d of each protrusion 102a with the contact surface 121s. The vibrator 101 has a plurality (two) contact points 102d in order to generate a larger driving force, but the plurality of contact points 102d are not always necessary. When the elliptical motion is generated in the protrusion 102a while the hemisphere 102c of the protrusion 102a is brought into pressure contact with the contact surface 121s of the friction member 121 by the pressure F1, a driving force F2 is generated between the hemisphere 102c and the contact surface 121s and the friction member 121 is rotationally driven around the rotation center axis P illustrated in FIGS. 1 to 3.

In this embodiment, as illustrated in FIGS. 3A and 3B, Rd is a driving radius, which is a distance from the rotation center axis P to the contact point 102d where the protrusion 102a contacts the contact surface 121s. The generating direction of the driving force F2 is a tangential direction (Z direction: first direction) in which a tangent line of a circle having a radius Rd around the rotation center axis P (circle passing through the contact point 102d) extends. When the signs of the vibration phases of the two vibration modes vary, the direction of the elliptical movement of the protrusion 102a changes and thus the generating direction of the driving force F2 is switched between the positive (+) direction and the negative (−) direction.

Figure 5A:
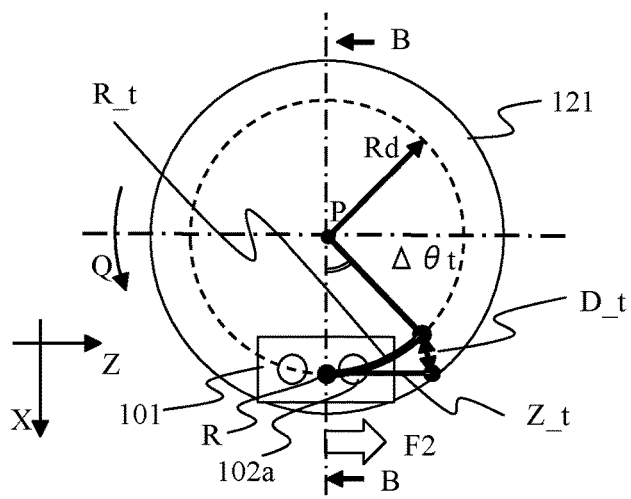
FIGS. 5A and 5B are a plan view and a sectional view explaining skidding.
Figure 5B:
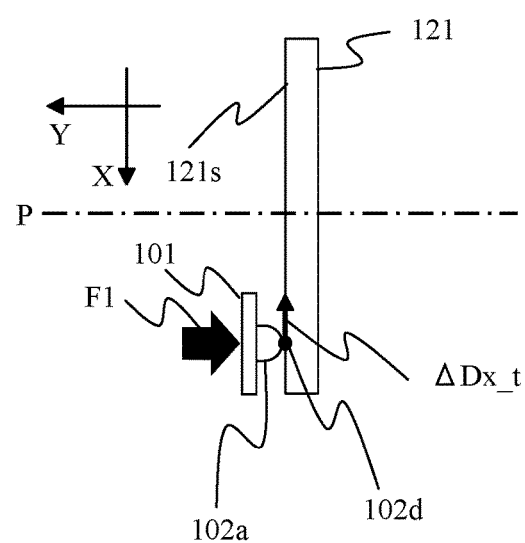

Referring now to FIGS. 5A and 5B, a description will be given of a skid of the friction member 121 relative to the vibrator 101 that occurs when the friction member 121 is rotationally driven in the conventional vibration type motor. FIG. 5A illustrates the conventional vibration type motor viewed from the Y direction, and FIG. 5B illustrates a section (XY section) of the conventional vibration type motor taken along a line B-B in FIG. 5A. Those elements in the conventional vibration type motor, which are corresponding elements of the vibration type motor according to this embodiment, will be designated by the same reference numerals as those of this embodiment.

In the conventional vibration type motor, the vibrator 101 disposed on the XZ plane orthogonal to the rotation center axis P is pressed against the friction member 121 in the Y direction parallel to the rotation center axis P. As described above, the elliptical movements of the two protrusions 102a of the vibrator 101 generate the driving force F2 in the tangential direction of the driving radius Rd around the rotation center axis P as a center (direction in the plane in which the protrusions 102a elliptically move), and rotationally drive the friction member 121 in a Q direction illustrated in FIG. 5A. A point R illustrated in FIG. 5A is a generating center position of the driving force F2 generated by the elliptical movements of the two protrusions 102a, and is located on the contact surface 121s. In FIG. 5A, for description convenience, an arrow of the driving force F2 is not drawn starting from the point R, but it is actually a force generated in the Z-axis direction starting from the point R.

In comparison with the generating direction of the driving force F2 (straight line direction), the friction member 121 is rotationally driven and thus the driving force generating direction and the driving direction of the driven unit are different from each other. Therefore, a loss of the driving force occurs by this directional difference amount. The loss of the driving force occurs when the protrusions 102a skid (laterally slip) relative to the contact surface 121s of the friction member 121 when the protrusions 102a transmit the driving force caused by the elliptical movements to the contact surface 121s.

More specifically, when the friction member 121 is rotationally driven by $\Delta\theta t$ by the driving force $\Delta F2$ generated per unit time $\Delta t$, a movement locus of the point R of the friction member 121 becomes an arc line segment R_t illustrated in FIG. 5A. On the other hand, if the driving direction of the driven member 121 is the Z direction similar to the driving force generating direction, the movement locus of the point R is a line segment Z_t illustrated in FIG. 5A. A difference D_t between R_t and Z_t is a loss of the driving force, and as illustrated in FIG. 5B, a skid component $\Delta Dx\_t$ is generated in the X direction. The skid component $\Delta Dx\_t$ is generated because there is a difference between the driving force generating direction and the driving direction of the driven member. The smaller the driving radius Rd is, the larger the skid component $\Delta Dx\_t$ becomes, and the larger the driving radius Rd is, the smaller the skid component $\Delta Dx\_t$ becomes because the rotational driving of the driven member becomes closer to the linear driving. Due to this skid component $\Delta Dx\_t$, the protrusions 102a excessively slide relative to the friction member 121 and cause the abrasion.

FIGS. 6A to 6D illustrate vibration type motors that prevent skidding which would otherwise occur due to the loss of driving force as described above. These vibration type motors are disclosed by this assignee in Japanese Patent Laid-Open No. 2019-126211.

Figure 6A:
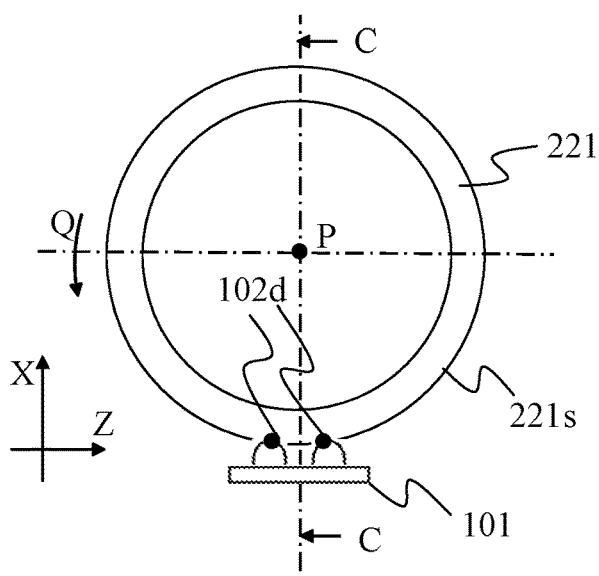
FIGS. 6A to 6E illustrate a vibration type motor in which skidding does not occur.
Figure 6B:
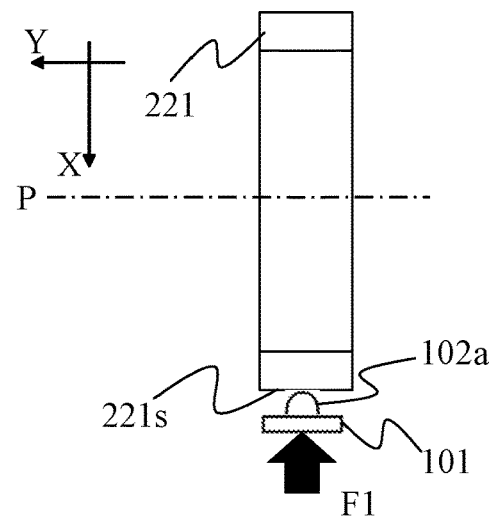
Figure 6C:
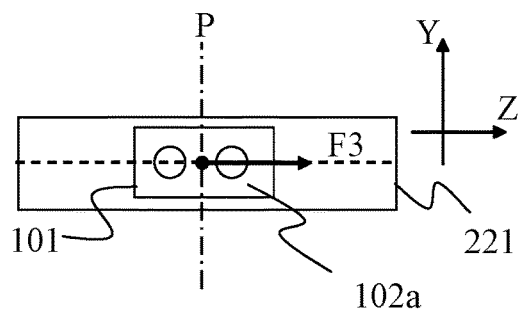
Figure 6D:
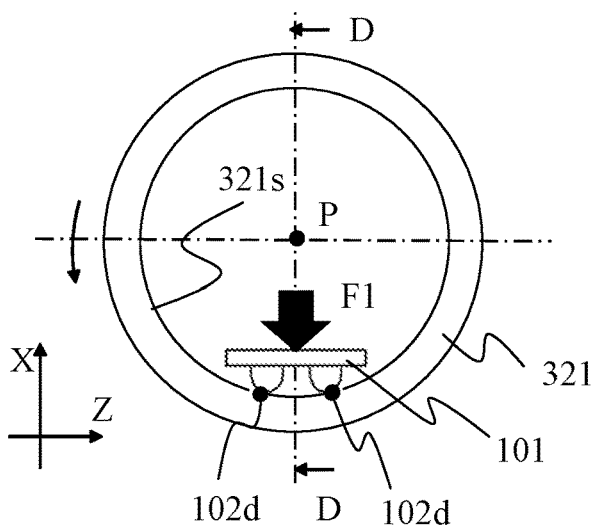
Figure 6E:
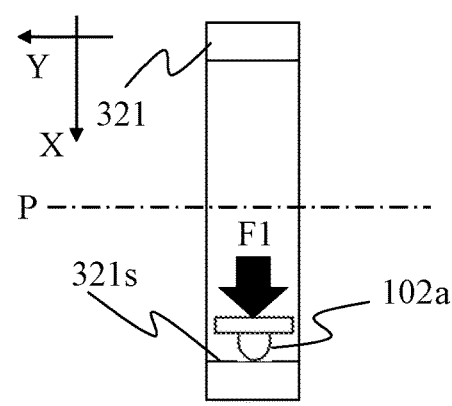

FIG. 6A illustrates a vibration type motor of an outer peripheral installation mode viewed from the Y direction in which the vibrator unit 101 is installed on the outer periphery of a friction member 221, and FIG. 6B illustrates a section of the vibration type motor of the outer peripheral installation mode taken along a line C-C in FIG. 6A. FIG. 6C illustrates the vibration type motor of the outer peripheral installation mode viewed from the X direction. FIG. 6D illustrates a vibration type motor of an inner peripheral installation mode viewed from the Y direction in which the vibrator unit 101 is installed on the inner circumference of an annular friction member 321. FIG. 6E illustrates a section of the vibration type motor of the inner peripheral installation mode taken along a line D-D in FIG. 6D.

In the vibration type motor of the outer peripheral installation mode illustrated in FIGS. 6A to 6C, the vibrator 101 is pressed by the pressure F1 from the outside of the friction member 221 in the radial direction to bring the protrusions 102a of the vibrator 101 into pressure contact with a contact surface (friction surface) 221s as an outer peripheral surface of the friction member 221 through the contact points 102d. Thereby, as illustrated in FIG. 6C, a driving force F3 is generated in the Z direction.

On the other hand, in the vibration type motor of the inner circumference arrangement mode illustrated in FIGS. 6D and 6E, the vibrator 101 is pressed by the pressure F1 from the inside of the friction member 321 in the radial direction to bring the protrusions 102a of the vibrator 101 into pressure contact with a contact surface (friction surface) 321s as an inner peripheral surface of the friction member 321 through the contact points 102d. Thereby, a driving force is generated in the Z direction as in the outer peripheral installation mode illustrated in FIG. 6C.

In these vibration type motors, the friction members 221 and 321 rotate around the rotation center axis P by the driving force generated in the Z direction similar to the friction member 121 of this embodiment. At this time, the friction members 221 and 321 rotate relative to the protrusions 102a of the vibrator 101 that elliptically move without skidding, and the generated driving force is completely used to rotationally drive the friction members 221 and 321.

However, in the vibration type motor of the outer peripheral installation mode, the pressurizing mechanism for pressurizing the vibrator 101 against the friction member 221 from the outside in the radial direction is disposed radially outside of the vibrator 101, so that the outer diameter of the vibrating type motor increases. In the vibration type motor of the inner peripheral installation mode, the pressurizing mechanism is disposed radially inside of the vibrator 101, so that the friction member needs a large inner diameter and the outer diameter dimension of the vibration type motor consequently increases.

This embodiment restrains skidding of the friction member relative to the vibrator without installing the vibrator on the outer circumference or the inner circumference of the friction member unlike the vibration type motors illustrated in FIGS. 6A to 6E. More specifically, the vibrator 101 tilts to the contact surface 121s of the friction member 121 around an axis parallel to the generating direction of the driving force.

FIGS. 7A to 7D illustrate an exemplary relationship between the vibrator 101 and the contact surface 121s in this embodiment using the same section as that in FIG. 5B. In each of the examples of FIGS. 7A to 7D, when the vibrator 101 is brought into pressure contact with the contact surface 121s by the pressure F1, a driving force is generated in the Z direction orthogonal to the paper plane of the figure at the contact point 102a.

In the example of FIGS. 7A and 7B, the vibrator 101 tilts to the contact surface 121s parallel to the XZ plane by an angle θ around the axis parallel to the Z axis. In the example of FIGS. 7C and 7D, the contact surface 121s tilts to the vibrator 101 disposed parallel to the XZ plane by the angle θ around the axis parallel to the Z axis. Thereby, the example of FIGS. 7A and 7D is closer to the outer peripheral installation mode illustrated in FIG. 6B, and the example of FIGS. 7B and 7C is closer to the inner peripheral installation mode illustrated in FIG. 6E, than the relationship between the vibrator 101 and the contact surface 121s illustrated in FIG. 5B. Thereby, the driving loss D_t generated in FIGS. 5A and 5B can be reduced, that is, the skid component ΔDt_x can be reduced. The tilt angle θ needs to be set so that the two protrusions 102a are stably brought into pressure contact with the contact surface 121s by the pressure F1 and the hemispheres 102c of the protrusions 102a contact the contact surface 121s only at the contact points 102d.

Figure 20A:
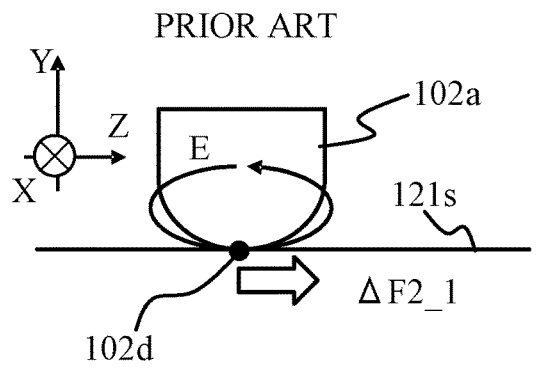
FIGS. 20A to 20F illustrate a relationship among the vibration of the vibrator, a tilt angle between the vibrator and the contact surface, and a generated driving force.
Figure 20D:
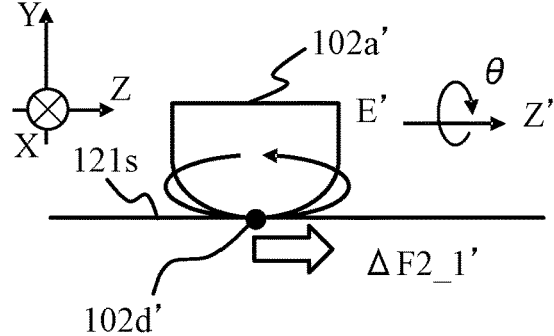
Figure 20B:
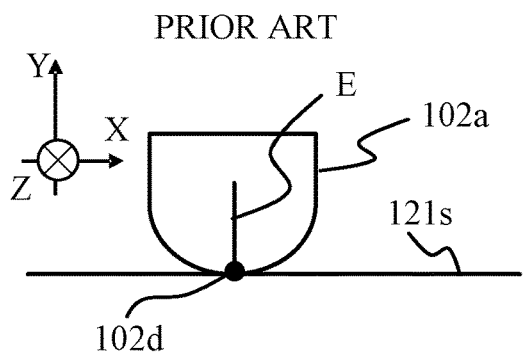
Figure 20E:
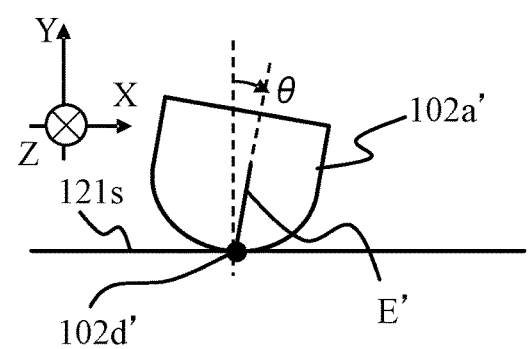
Figure 20C:
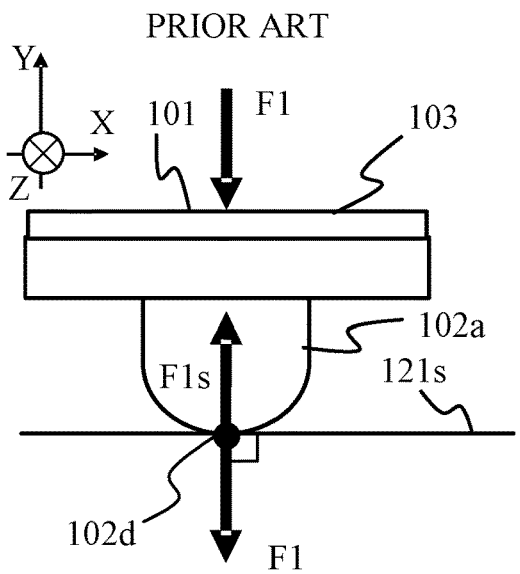
Figure 20F:
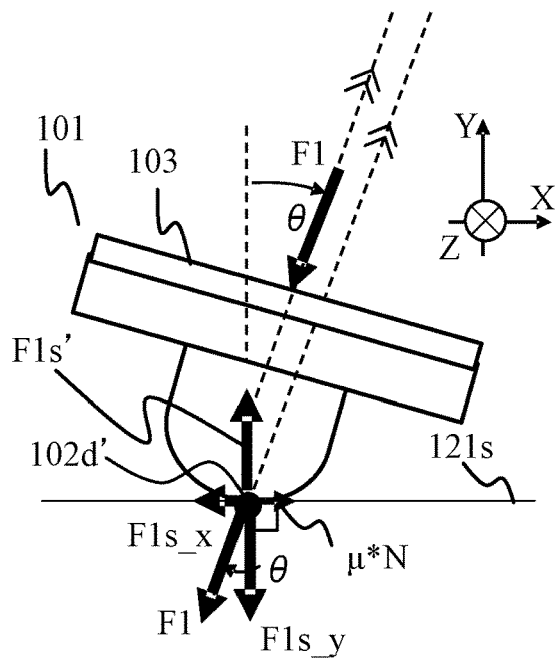

Referring now to FIGS. 20A to 20F, a description will be given of a relationship between the tilt angle θ, the elliptical motion of the protrusion 102a in the vibration mode of the vibrator 101 illustrated in FIG. 4C, and the driving force generated by the vibration type motor 100. FIGS. 20A to 20F illustrate the relationship among the vibration of the vibrator, the tilt angle between the vibrator and the contact surface, and the generated driving force. FIGS. 20A to 20C explain the conventional vibration type motor with the tilt angle θ of zero, and FIGS. 20D to 20F explain the vibration type motor, such as the vibration type motor 100 according to this embodiment, in which the vibrator 101 is tilted by θ around an axis parallel to the driving force generating direction. FIG. 20B corresponds to FIG. 20A viewed from the Z-axis direction, and FIG. 20E corresponds to FIG. 20D viewed from the Z-axis direction. FIGS. 20A and 20D correspond to one protrusion 102a of the elastic member 102 illustrated in FIG. 4C, and the Z-axis direction as the lateral direction in the paper plane is the driving force generating direction. FIGS. 20C and 20F are views viewed from the Z-axis direction similar to FIGS. 20B and 20E, and illustrate the relationship between forces generated at the contact point 102d where the vibrator 101 contacts the contact surface 121s due to the pressure F1 applied to the vibrator 101.

FIG. 20A illustrates the conventional vibration type motor, in which the protrusion 102a contacts the contact surface 121s at the contact point 102d and makes the elliptical motion indicated by the arrow E, so that the protrusion 102a generates a driving force ΔF2-1 per unit time in the Z-axis direction. On the other hand, FIG. 20D illustrates the vibration type motor according to this embodiment, in which the vibrator is tilted by θ around a Z' axis parallel to the Z axis. The protrusion 102a' contacts the contact surface 121s at the contact point 102d', and generates a driving force ΔF2-1' per unit time in the Z-axis direction by the elliptical motion indicated by the arrow E'. Since each of the elliptical motions indicated by the arrows E and E' generates the driving force only in the Z-axis direction at the contact points 102d and 102d', the tilt angle θ causes no driving loss in the driving force generation by the elliptical motion of the protrusion 102a'. ΔF2_1=ΔF2_1' is met.

If a force F1s' that the contact point 102d' receives vertically from the contact surface 121s is smaller than the pressure F1 due to the tilt angle θ, the force by which the protrusion 102a presses the contact surface 121s during the elliptical motion becomes smaller and consequently the driving force becomes smaller. As illustrated in FIG. 20C, when the pressure F1 is applied to the vibrator 101 and the vibrator 101 and the contact surface 121s are parallel, the force F1s that the contact point 102d receives vertically from the contact surface 121s is equal to the pressure F1. On the other hand, as illustrated in FIG. 20F, when the pressure F1 is rotated by θ around the axis parallel to the Z axis, the pressure F1 is divided at the contact point 102d' into F1s_y in the Y-axis direction and F1s_x in the X-axis directions. Since the force F1s' that the contact point 102d' receives vertically from the contact surface 121s is equal to F1s_y and F1s_y=F1*cos θ, F1s'<F1 is met. That is, depending on the rotation angle θ, the force by which the protrusion 102a' presses the contact surface 121s may become small, and the driving force may become small. In order to avoid a decrease in driving force, it is necessary to design the pressure F1 to be large according to the rotation angle θ so that F1s' becomes a desired force.

The force F1s_x applied to the contact point 102d' in the X-axis direction is expressed as F1s_x=F1*sin θ and thus increases as the tilt angle θ increases. Where μ is a friction coefficient between the protrusion 102a and the contact surface 121s and N is a normal force (=F1s'), if F1s_x becomes larger than μ*N, the contact point 102d' begins to slip on the contact surface 121s and cannot generate the driving force.

As discussed, the tilt angle θ can reduce the skid component ΔDt_x as described above, but may reduce the force that the contact point 102d' receives vertically from the contact surface 121s and consequently the driving force. Excessively large θ may cause the contact point 102d' to slip on the contact surface 121s, and may not be able to generate no driving force. In that case, the pressure F1 may be set larger by the reduction amount of the force that the contact point 102d' receives vertically from the contact surface 121s, and θ may be adjusted so that the contact point 102d' does not slip on the contact surface 121s and can stably contact the contact surface 121s.

As illustrated in FIGS. 1 and 7A, in this embodiment, the vibrator 101 tilts to the contact surface 121s by an angle θ1 to the outside in the radial direction (in the clockwise direction) of the friction member 121. The tilt of the vibrator 101 means the tilt of the plane part of the vibrator 101 (elastic member 102) provided with the protrusion 102a.

In FIG. 1, T (second axis) is an axis that is parallel to the Z axis as the generating direction of the driving force, and passes through the contact point 102d where the protrusion 102a contacts the contact surface 121s. S is a straight line passing through the contact point 102d and parallel to the rotation center axis P (that is, orthogonal to the contact surface 121s).

This embodiment holds the vibrator 101 in a tilt attitude around the axis T so as to form an angle θ1 from the line S, and thereby tilts the vibrator 101 to the contact surface 121s of the friction member 121 at the same angle θ1. This attitude is held by making the thickness of the part radially outside of the frame member (attitude determining member) 113 that holds the vibrator 101 via the first holding member 104 in the Y direction smaller than the thickness of the part radially inside of the frame member 113, and thereby by forming the angle θ1 between the first holding member 104 and the chassis 122d. The second holding member 107 that holds the pressurizing mechanism is fixed onto the frame member 113. Therefore, the vibrator 101 and the vibrator unit including the pressurizing mechanism integrally tilt to the friction member 121 rotatably held on the base member 122, by an angle θ1 around the axis T.

This embodiment disposes the vibrator 101 to the contact surface 121s of the friction member 121, and realizes a configuration that suppresses skidding of the friction member 121 relative to the vibrator 101 while avoiding an increase in size in the radial direction. Thereby, the loss of driving force, the wear of the vibrator 101, and the generation of abrasion powder can be suppressed.

The vibrator 101 may tilt to the friction member 121 to the inside in the radial direction (counterclockwise direction), as illustrated in FIG. 7B. Even in this case, the same skid suppressing effect is available. However, in order to prevent the abrasion powder from adhering to part of or near the rolling ball 108 and the shaft member 121a if the abrasion power is generated, the vibrator 101 may tilt to the friction member 121 to the outside in the radial direction (in the clockwise direction) as in this embodiment.

Second Embodiment

A description will now be given of a vibration type motor 200 according to a second embodiment of the present invention. The second embodiment adopts the configuration illustrated in FIG. 7A similar to the first embodiment, but realizes the configuration using a method different from that of the first embodiment. The second embodiment will omit a description of the parts common to the first embodiment.

The first embodiment tilts the vibrator unit to the friction member 121 by an angle θ1 around the axis T. On the other hand, the second embodiment tilts only the vibrator 101 by an angle θ2 around the axis T using the small base 106 which is a part of the pressurizing mechanism.

Figure 8:
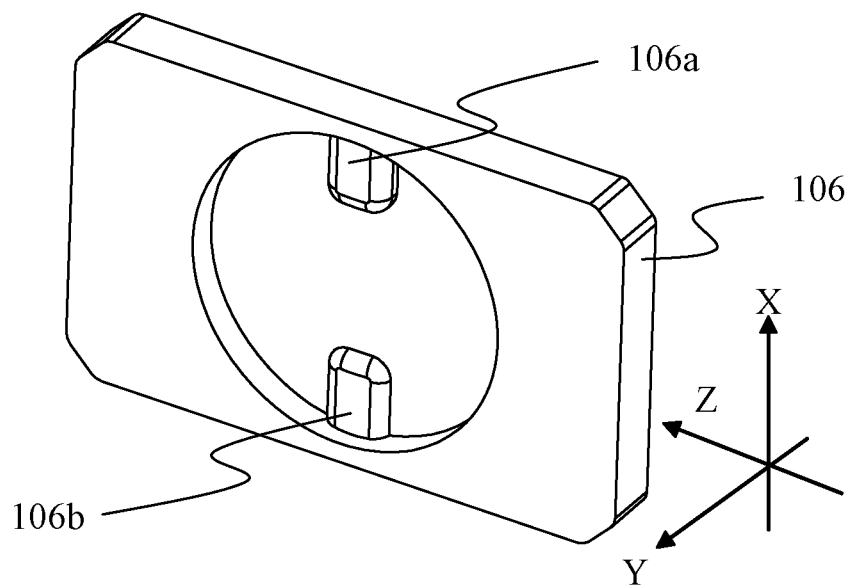
FIG. 8 is a perspective view of a small base according to the first embodiment.
Figure 9:
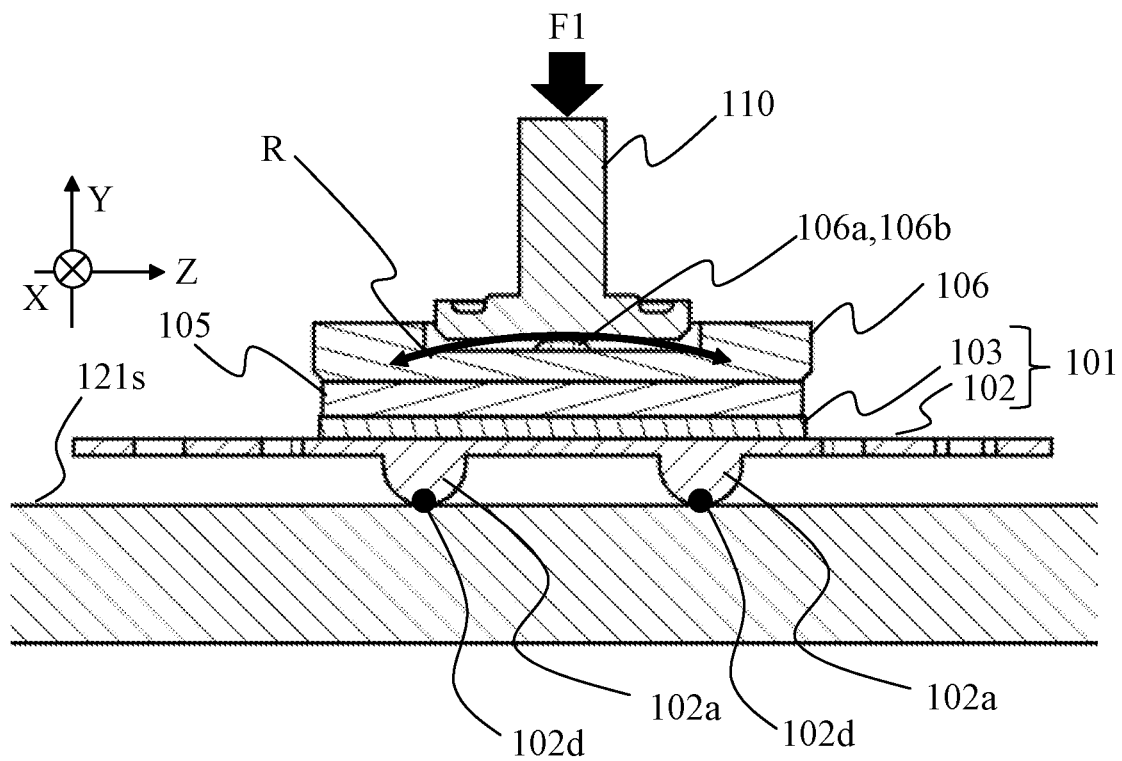
FIG. 9 is a sectional view taken along a line F-F in FIG. 2C.

Referring now to FIGS. 8 and 9, a description will be given of the small base 106 in this embodiment. The small base 106 illustrated in FIG. 8 has two convex members (contact members) 106a and 106b having a thickness (height) in the Y direction. FIG. 9 illustrates a section of the vibration type motor 200 corresponding to a section taken along a line F-F in FIG. 2C, and FIG. 10 illustrates a section of the vibration type motor 200 corresponding to a section taken along a line A-A of FIG. 2C.

As described in the first embodiment, the small base 106 is a pressure transmitting member that transmits the pressure F1 from the pressurizing member 110 to the vibrator 101. The transmission path of the pressure F1 is as follows. In FIG. 9, an unillustrated pressure spring 111 contacts the pressure member 110, and the pressure member 110 contacts the convex members 106a and 106b of the small base 106. The small base 106 comes into surface contact with the piezoelectric element 103 via the blocking member 105. Through such a transmission path, the pressure F1 generated by the pressure spring 111 is transmitted to the vibrator 101.

At this time, the small base 106 contacts the pressurizing member 110 at the convex members 106a and 106b and thereby has a degree of freedom to rotate in the direction of arrow R in FIG. 9 (around the axis parallel to the X axis) relative to the pressurizing member 110. This intends to rotationally drive the friction member 121 smoothly by uniformly applying the pressure F1 to the entire vibrator 101 via the small base 106, and by always transmitting the elliptical motions to the contact surface 121s via the two contact points 102d. Unnecessary vibrations other than the elliptical motions and unsteadiness caused by the component tolerances and assembly variations are absorbed by the rotational freedom of the small base 106 in the direction of the arrow R.

Figure 10:
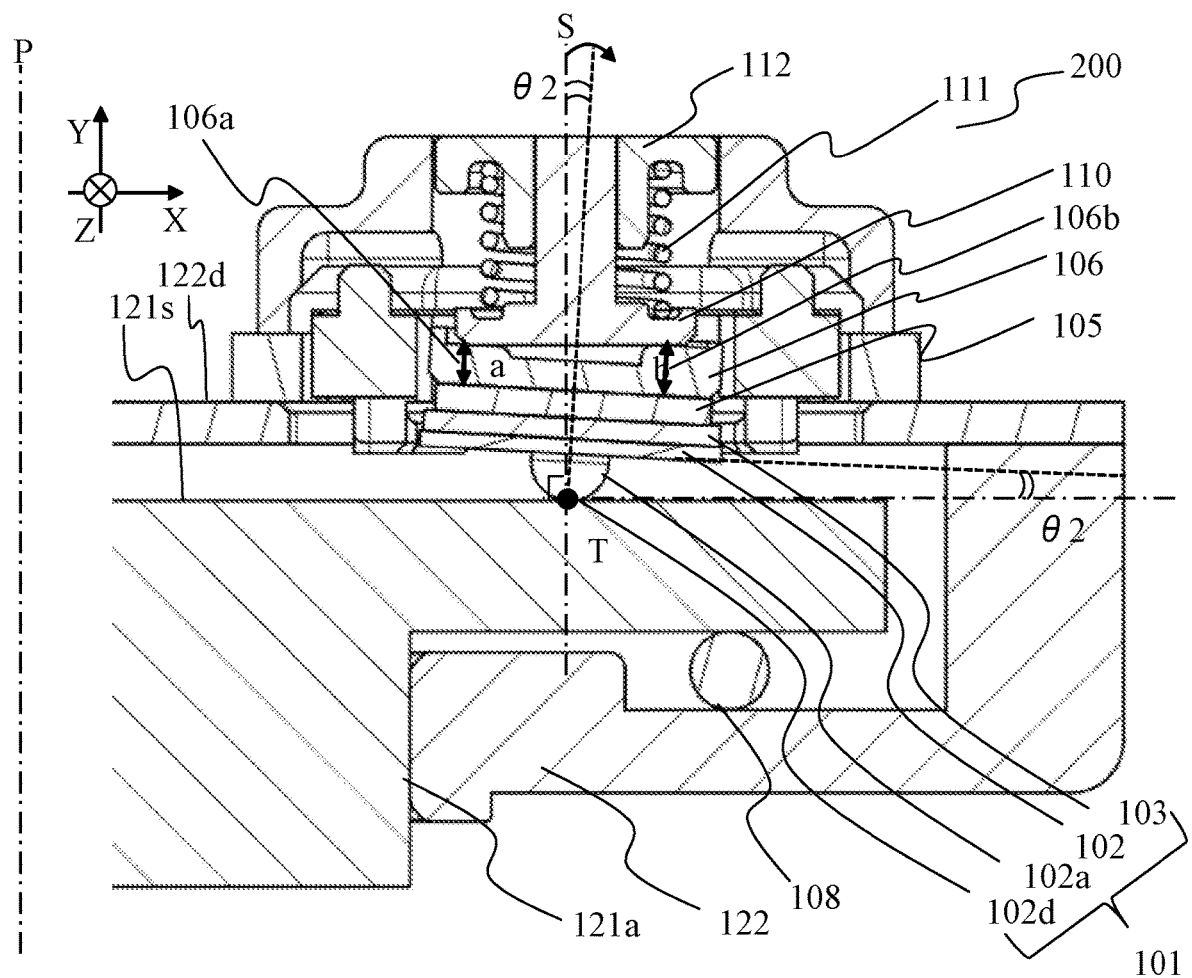
FIG. 10 is a sectional view of a vibration type motor according to a second embodiment.

This embodiment uses the small base 106 as the attitude determining member, as illustrated in FIG. 10. More specifically, a thickness "a" of the convex member 106a and a thickness "b" of the convex member 106b in the Y direction are made different from each other. In this embodiment, a<b is set. Thereby, similar to the first embodiment, the vibrator 101 can be held in an attitude tilted by the angle θ2 to the contact surface 121s around the axis T parallel to the Z direction as the generating direction of the driving force. However, unlike the first embodiment, the pressurizing mechanism does not tilt. Even if the heights "a" and "b" of the convex members 106a and 106b are different from each other, the degree of freedom in the arrow R direction of the small base 106 is maintained.

This embodiment only changes the height of one of the convex members 106a and 106b in the small base 106, sets the tilt angle of the vibrator 101 to the contact surface 121s, and more easily adjusts the tilt angle than the first embodiment.

Third Embodiment

A description will now be given of a vibration type motor 300 according to a third embodiment of the present invention. The third embodiment adopts the configuration illustrated in FIG. 7D while making a shape of the friction member 121 different from that of the first embodiment. A description of elements in the third embodiment will be omitted, if they are corresponding elements in the first embodiment.

Figure 11:
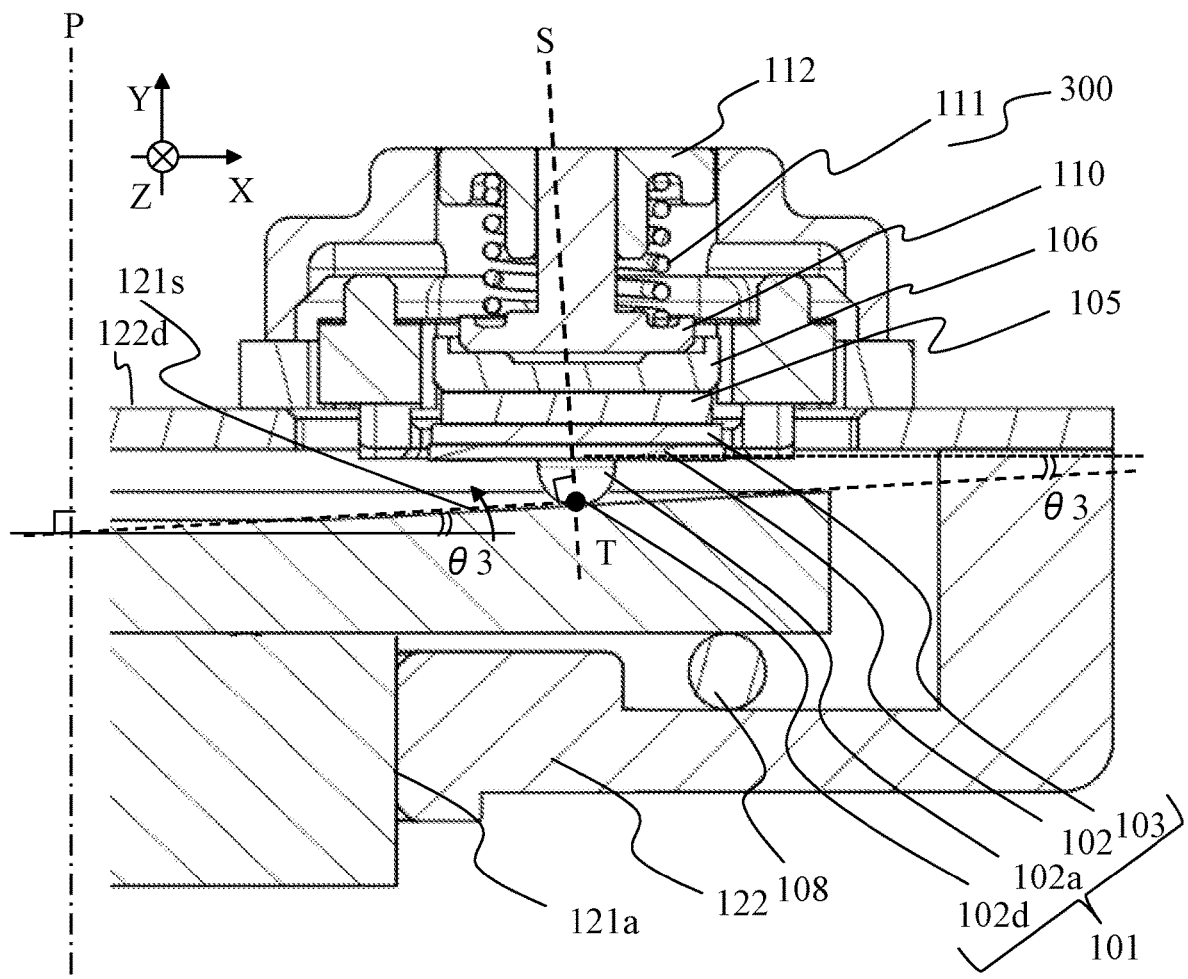
FIG. 11 is a sectional view of a vibration type motor according to a third embodiment.

FIG. 11 illustrates a section of the vibration type motor 300 corresponding to the section taken along the line A-A in FIG. 2C. This embodiment holds the vibrator 101 in the attitude parallel to the XZ plane. On the other hand, the friction member 121 is formed so that the contact surface 121s with which the protrusion 102a of the vibrator 101 is brought into contact is not orthogonal to the rotation center axis P and tilts by an angle θ3 to the inside in the radial direction. That is, the contact surface 121s is a tilt surface like a bank shape. Since the friction member 121 has such a shape, the vibrator 101 tilts to the contact surface 121s by the angle θ3 around the axis T, and the configuration illustrated in FIG. 7D is implemented.

The contact surface 121s may tilt to the outside in the radial direction as illustrated in FIG. 7C, but in order to prevent the abrasion powder from adhering to part of and near the rolling ball 108 and the shaft member 121a, the contact surface 121s may tilt to the inside in the radial direction, like this embodiment.

In each of the above embodiments, only one of the vibrator 101 and the contact surface 121s tilts to the XZ plane, but both of them may tilt to the XZ plane in opposite directions.

Fourth Embodiment

A description will now be given of a vibration type motor 400 according to a fourth embodiment of the present invention. The vibration type motor 400 corresponds to the vibration type motor 100 according to the first embodiment having the configuration illustrated in FIG. 7A in which the attitude of the vibrator 101 is changed. A description of elements in this embodiment will be omitted, if they are corresponding elements in the vibration type motor 100.

Figure 12:
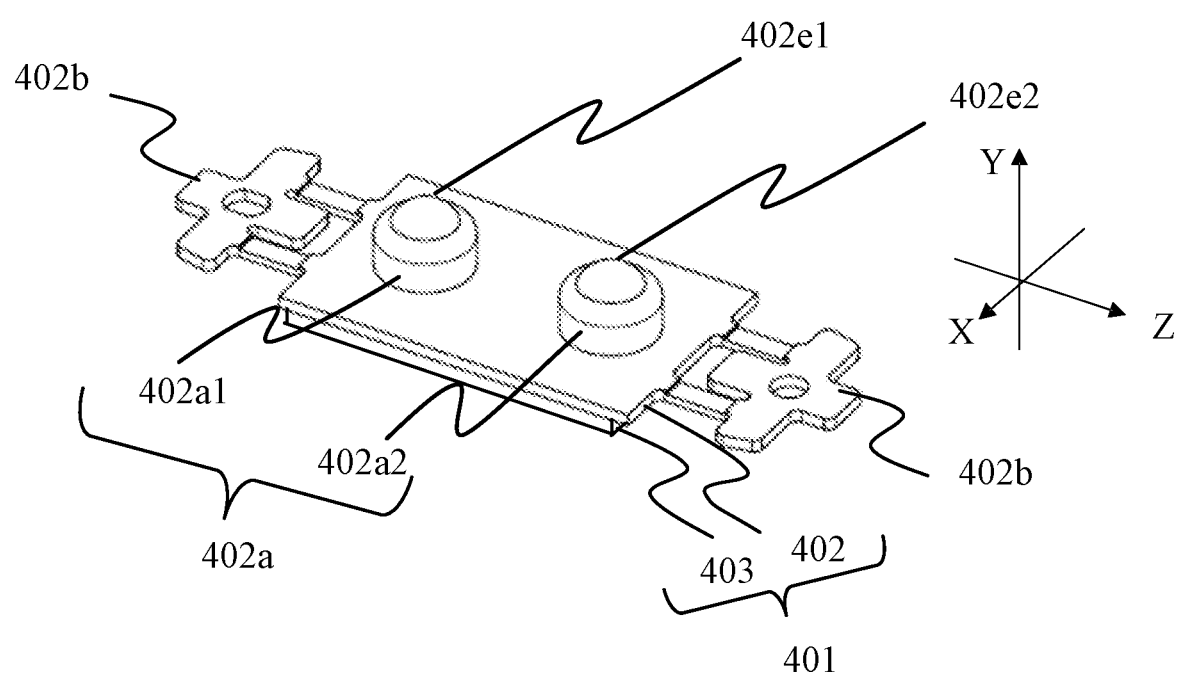
FIG. 12 illustrates a detailed shape of a vibrator according to a fourth embodiment.

FIG. 12 illustrates a detailed shape of a vibrator 401 according to the fourth embodiment. The vibrator 401 includes a piezoelectric element 403 and an elastic member 402. The elastic member 402 has two protrusions 402a (first protrusion 402a1 and second protrusion 402a2). Tips of the protrusions 402a1 and 402a2 have hemispheres (curved surfaces) 402e1 and 402e2, respectively.

The elastic member 402 has held members 402b at both ends thereof. Like the held member 102b in the first embodiment, the held member 402b is held by and integrated with an unillustrated first holding member.

A description will now be given of the attitude of the vibrator 401 relative to the friction member 421 and the contact area of the vibrator 401 with the friction member 421 in the vibration type motor 400.

Figure 13:
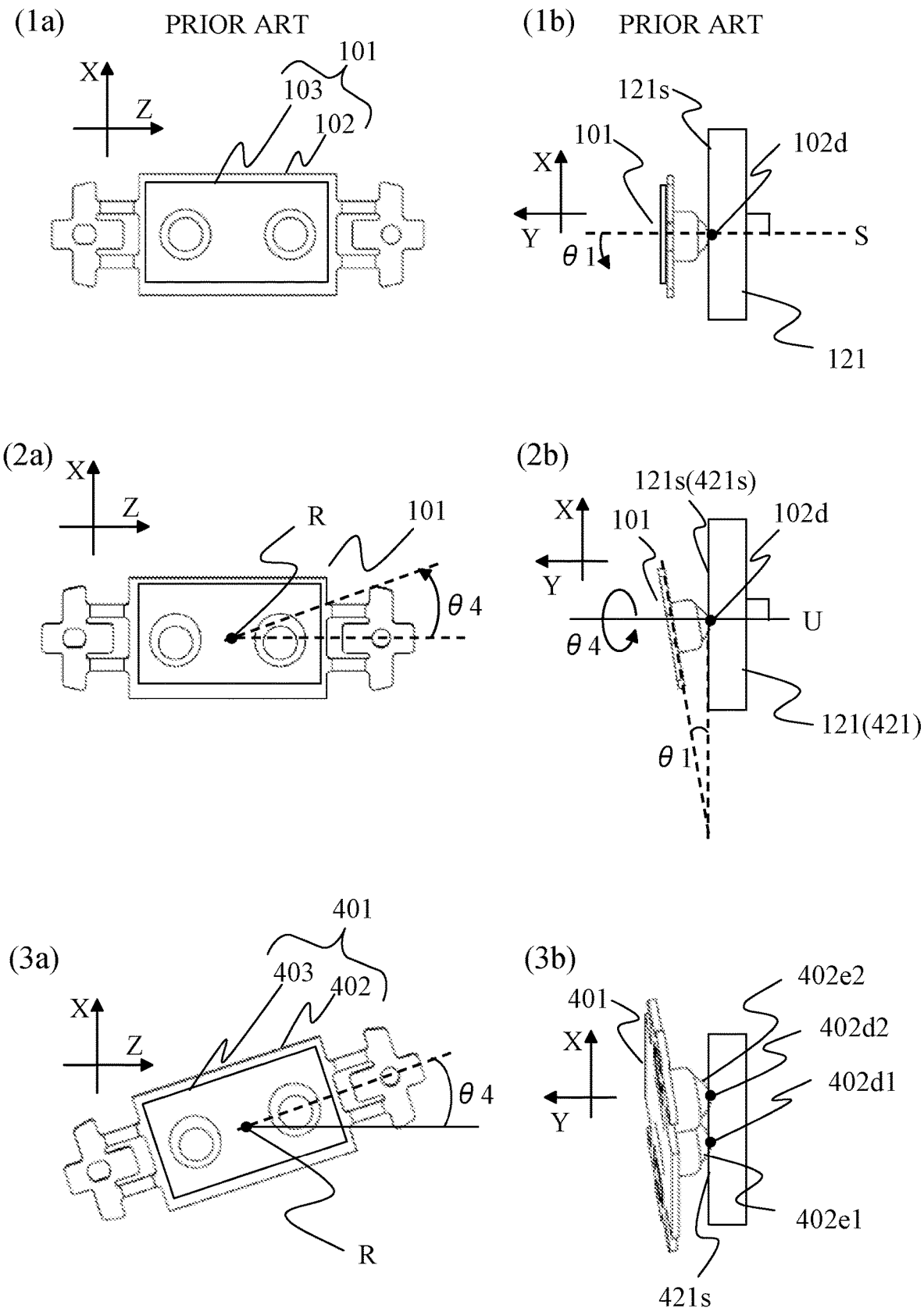
FIG. 13 illustrates attitudes of the vibrators in the first and fourth embodiments.

FIGS. 13 (1a) and 13 (1b) show the attitude of the vibrator 101 relative to the friction member 121 in the conventional vibration type motor 100 that does not suppress skidding of the friction member 121 relative to the vibrator 101. FIGS. 13 (2a) and 13 (2b) show the attitude of the vibrator 101 relative to the friction member 121 in the vibration type motor 100 according to the first embodiment that suppresses skidding of the friction member 121 relative to the vibrator 101. FIGS. 13 (3a) and 13 (3b) show the attitude of the vibrator 401 relative to the friction member 421 in the vibration type motor 400 according to this embodiment. FIGS. 13 (1a), (2a), and (3a) show each vibrator viewed from the Y direction, and FIGS. 13 (1b), (2b), and (3b) show each vibrator and each friction member viewed from the Z direction.

The vibrator 101 in the vibration type motor 100 according to the first embodiment illustrated in FIGS. 13 (2a) and 13 (2b) has an attitude that tilts by θ1 to a straight line S that passes through the contact point 102d on the contact surface 121s of the friction member 121 and is orthogonal to the contact surface 121s in comparison with the conventional attitude illustrated in FIGS. 13 (1a) and 13 (1b).

The vibrator 401 in the vibration type motor 400 according to this embodiment illustrated in FIGS. 13 (3a) and 13 (3b) has an attitude rotated by θ4 around a straight line U to a tangential direction (Z direction) of a circle centered on the rotation center axis P in comparison with the vibrator 101 according to the first embodiment illustrated in FIGS. 13 (2a) and 13 (2b). The straight line U passes through the same point R as in FIG. 5A and orthogonal to the contact surface 121s (421s) of the friction member 121 (421).

Figure 14:
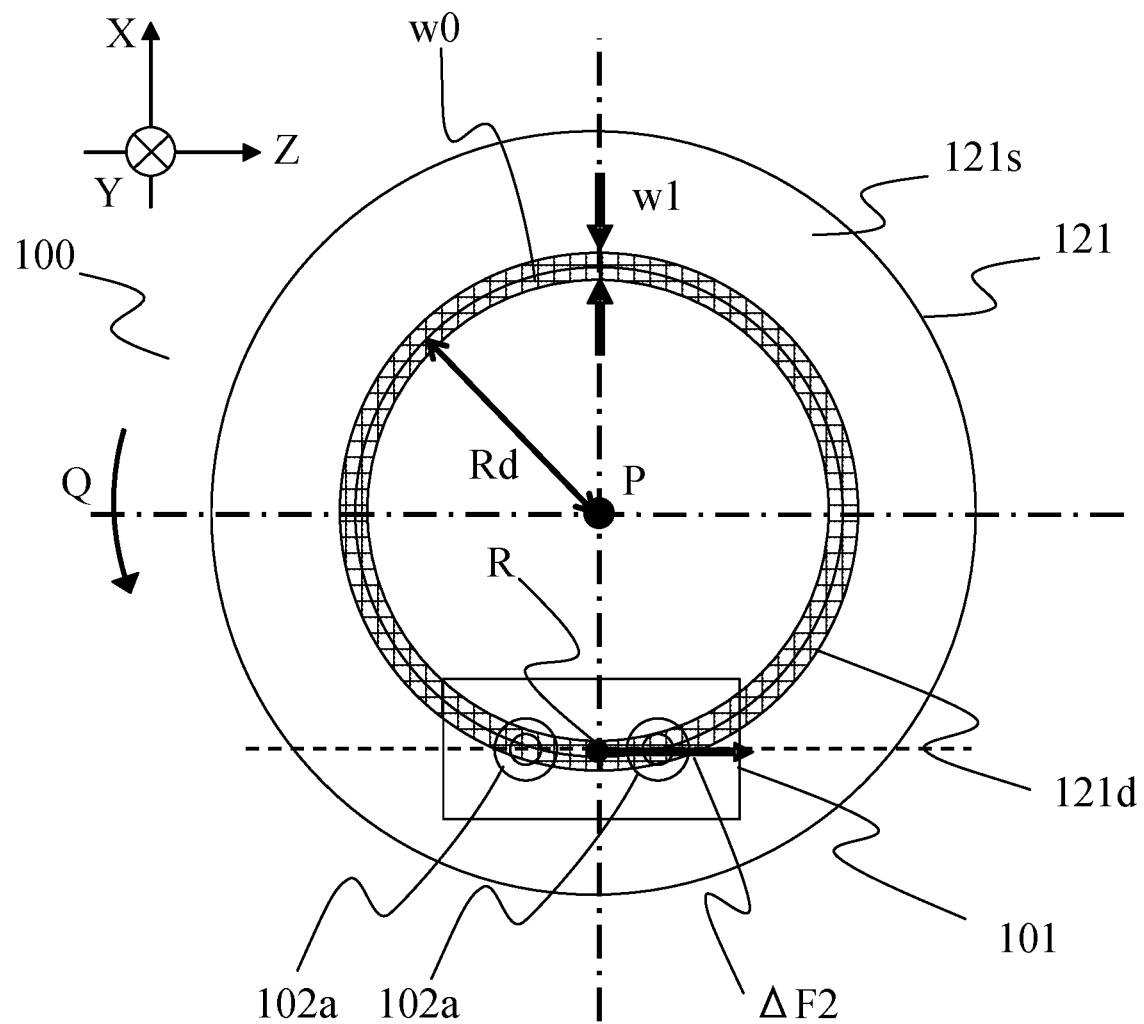
FIG. 14 illustrates a contact area between a vibrator and a friction member in the first embodiment.

FIG. 14 illustrates a contact area 121d in which the two protrusions 102a (hemisphere 102c) of the vibrator 101 in the vibration type motor 100 according to the first embodiment viewed from the Y direction come contact the contact surface 121s of the friction member 121. The contact area 121d indicates a contact area when the friction member 121 is rotatable by 360 degrees. At the initial stage of driving the vibration type motor 100, the protrusions 102a contact the contact surface 121s at the contact points 102d, so that the contact area w0 becomes a circular line.

When driving continues for a long period of time after the initial driving, one or both of the protrusion 102a and the contact surface 121s are worn, so that the contact area 421d becomes the contact area 121d having a circular band (annular) shape having a width w1 from the linear contact area w0. A point R in FIG. 14 is the point R illustrated in FIG. 5A, which is the center of the driving force F2 generated by the two protrusions 102a of the vibrator 101.

In the vibration type motor 100 according to the first embodiment, as illustrated in FIG. 14, the vibrator 101 has an attitude such that two protrusions 102a are aligned with the tangential direction (Z direction) of the circle having the radius Rd and centered on the rotation center axis P. Therefore, the two protrusions 102a come into contact with the contact surface 121s in the same contact area 121d. When the vibration type motor 100 is driven, the two protrusions 102a wear the same contact area 121d on the contact surface 121s.

Figure 15:
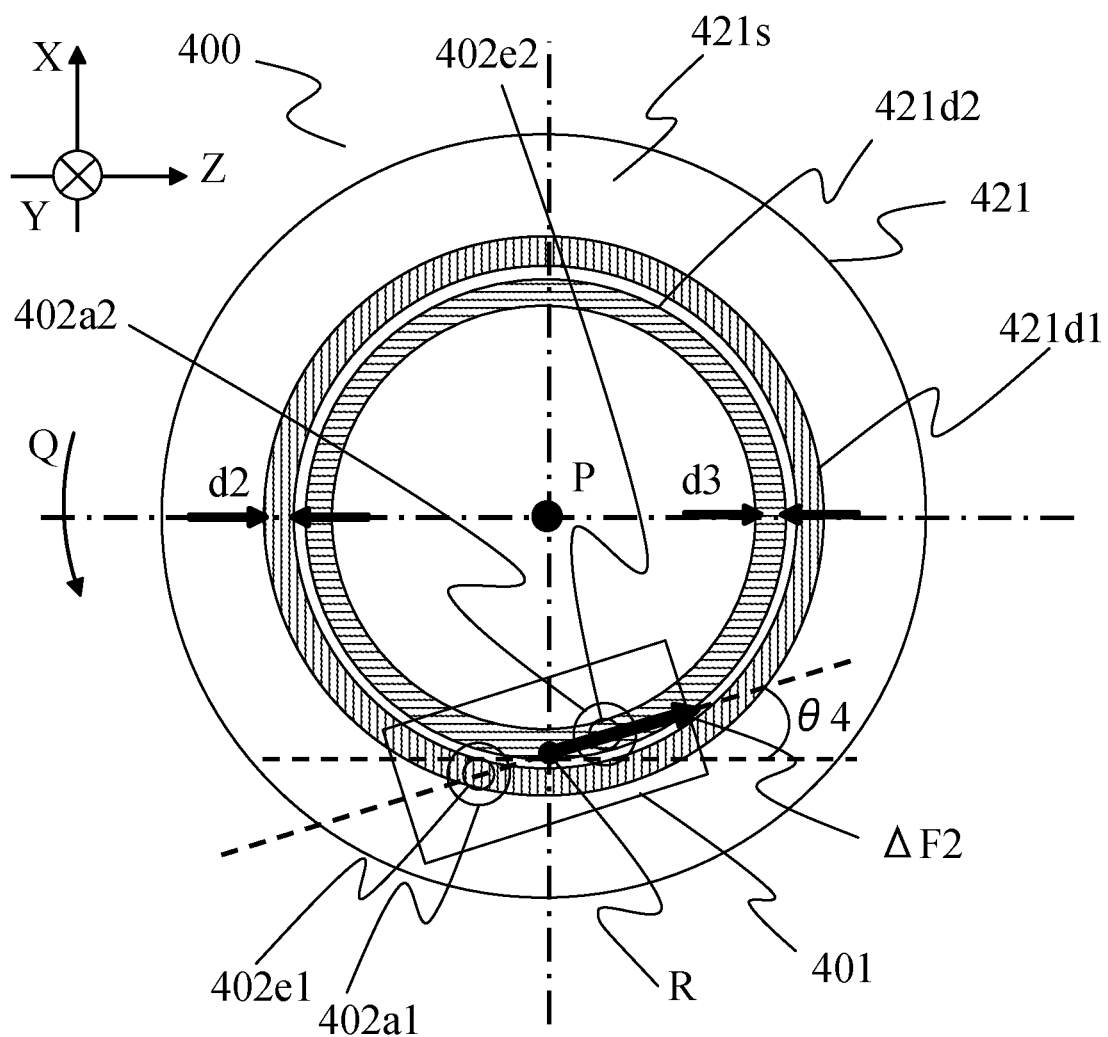
FIG. 15 is another diagram showing a contact area between a vibrator and a friction member in the fourth embodiment.

FIG. 15 illustrates contact areas 421d1 and 421d2 in which the two protrusions 402a1 and 402a2 (hemispheres 402e1 and 402e2) of the vibrator 401 in the vibration type motor 400 according to this embodiment viewed from the Y direction contact the contact surface 421s of the friction member 421. In the vibration type motor 400 according to this embodiment, as described above, the vibrator 401 has an attitude rotated by an angle θ4 relative to the Z direction, which is the tangential direction of the circle centered on the rotation center axis P of the friction member 421 around the straight line U.

At this time, an aligning direction of the protrusions 402a1 and 402a2 is a direction that has the angle θ4 relative to the Z direction, and the Z direction is the first direction in which the tangent line of the circle centered on the rotation center axis P extends. The vibrator 401 tilts to the contact surface 421s around the second axis parallel to the first direction. Due to the attitude of the vibrator 401, a distance from the rotation center axis P to the protrusion 402a1 and a distance to the protrusion 402a2 in the vibrator 401 that tilts to the contact surface 421s are different from each other. As a result, as illustrated in FIG. 15, the protrusions 402a1 and 402a2 of the vibrator 401 contact the contact surface 421s of the friction member 421 in different contact areas 421d1 and 421d2.

The contact area 421d1 which the protrusion 402a1 contacts and the contact area 421d2 which the protrusion 421d2 contacts form circular band areas having widths d2 and d3, respectively, when the vibration type motor 400 is driven for a long period of time. Thus, in the vibration type motor 400, the two protrusions 402a1 and 402a2 contact the contact surfaces 421s in different contact areas 421d1 and 421d2, and the vibrator 401 and the friction member 421 are more slowly wear (at an approximately half speed) than those of the vibration type motor 100 according to the first embodiment. As a result, the life of the vibration type motor 400 can become longer than the vibration type motor 100 according to the first embodiment, and the generation of the abrasion powder can be reduced.

However, in the vibration type motor 400 according to this embodiment, the generating direction of the driving force in the tangential direction changes by the rotation amount θ4 of the vibrator 401 from the vibrator 101 according to the first embodiment. The driving efficiency may be lower than that of the vibration type motor 100 according to the first embodiment. More specifically, when θ4 is 0 degrees (no rotation), the driving force generating direction is the tangential direction (Z direction) of the circle having the radius Rd and centered on the rotation center axis P, and the force acting around the rotation axis is radius×tangent. Therefore, the efficiency of the rotating force around the P axis at this time is 100%. However, when θ4 is 90 degrees, the driving force is generated in the direction orthogonal to the tangent line (X direction), there is no component in the tangential direction, and thus no rotation is available around the P axis. That is, as θ4 approaches to 90 degrees, the driving force in the tangential direction required for the rotation becomes smaller, and the rotational force for rotating the driven member becomes weaker.

Figure 16:
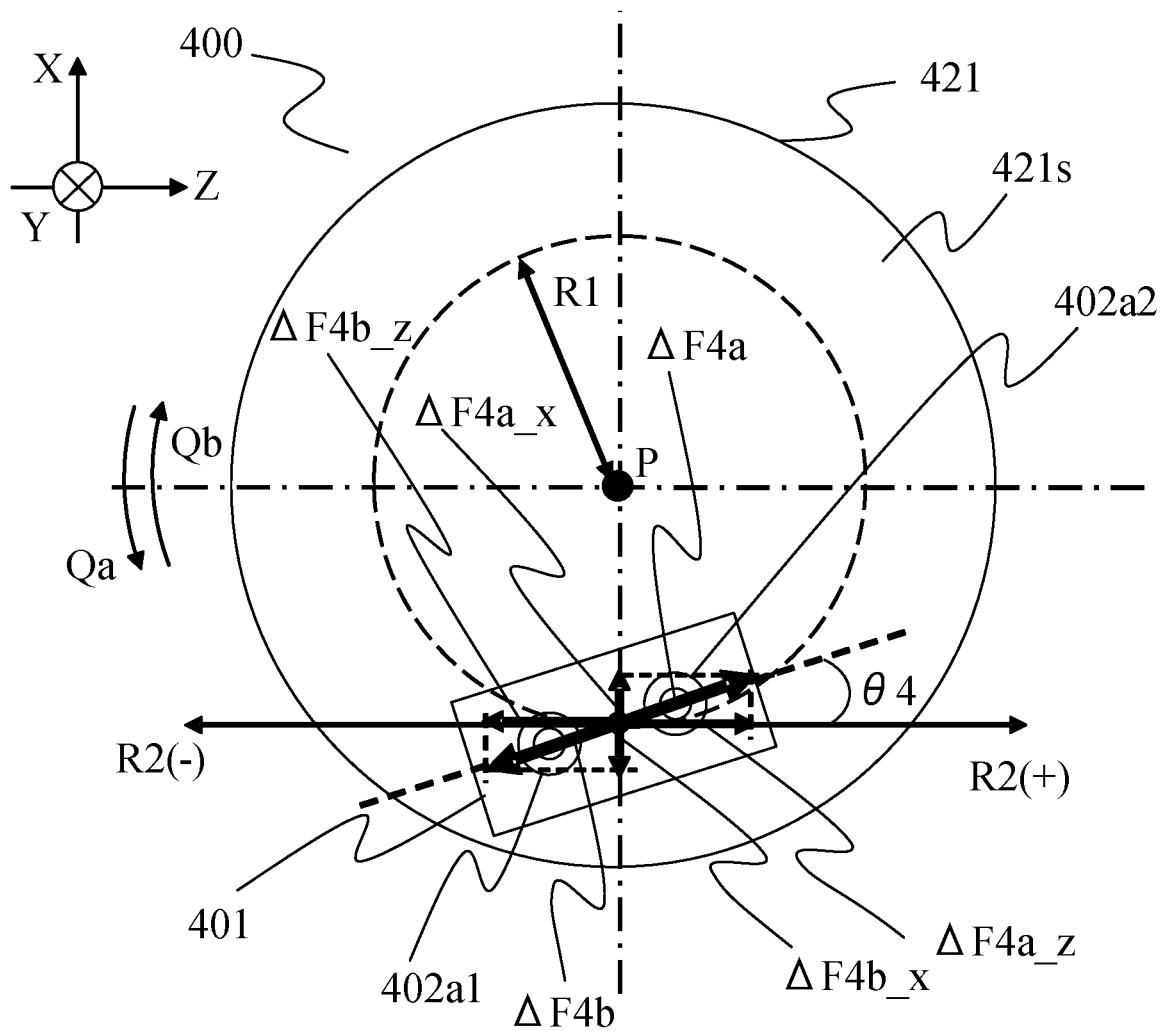
FIG. 16 illustrates a rotating direction and a driving force in the vibration type motor according to the fourth embodiment.

The effect also differs depending on the rotating direction of the vibration type motor 400. FIG. 16 illustrates the rotating direction and the driving force of the vibration type motor 400 according to this embodiment. Qa is a direction in which the friction member 421 rotates counterclockwise, and Qb is a direction in which the friction member 421 rotates clockwise.

In FIG. 16, when a voltage is applied to the piezoelectric element 403 and the rotating direction of the friction member 421 is Qa, a driving force is generated in the aligning direction (first direction) of the protrusions 402a1 and 402a2 in the vibrator 401 similar to the vibration type motor 100 according to the first embodiment. A driving force ΔF4a per unit time at this time is decomposed into ΔF4a_z in the Z direction parallel to the tangent line R2 and ΔF4a_x in the X direction orthogonal to the Z direction. ΔF4a_z is ΔF4× cos θ4 and is smaller than ΔF4a. That is, the driving force component used to rotationally drive the friction member 421 is reduced by rotating the vibrator 401 by θ4. ΔF4a_x in the X direction is ΔF4a×sin θ4, but the direction is the −X direction toward the rotation center axis P.

On the other hand, when the rotating direction of the friction member 421 is Qb, the driving force is generated in the aligning direction of the protrusions 402a1 and 402a2 of the vibrator 401 and in a direction opposite to the direction when the rotating direction is Qa. A driving force ΔF4b per unit time at this time is decomposed into ΔF4b_z in the Z direction and ΔF4b_x in the X direction. ΔF4b_z is ΔF4×cos θ4 and smaller than ΔF4b. That is, the driving force component used to rotationally drive the friction member 421 is reduced by rotating the vibrator 401 by θ4. ΔF4b_x in the X direction is ΔF4b×sin θ4, but the direction is the +X direction away from the rotation center axis P.

In this way, when the magnitudes of ΔF4a and ΔF4b are equal to each other, the magnitudes of the driving force components decomposed in the Z direction and the X direction are equal to each other regardless of the rotating directions Qa and Qb. However, regarding the driving force component in the X direction, its acting direction differs depending on the rotating directions Qa and Qb. When the rotating direction is Qa, the driving force component acts in the −X direction, so that the friction member 421 rotates while receiving a force in the −X direction. On the other hand, when the rotating direction is Qb, the driving force component acts in the +X direction, so that the friction member 421 rotates while receiving a force in the +X direction. In this case, if there is a gap such as unsteadiness between the driven member and the driving member, the gap reducing direction differs depending on the rotating direction, so it is conceivable that the magnitude of the driving force required for rotational driving will change depending on the rotating direction. In this way, when it is expected that the magnitude of the driving force changes depending on the rotating direction, the driving force may be controlled with different control parameters that depend on the rotating direction in the control unit that controls driving of the vibration type motor 400.

As illustrated in FIG. 15, the angle θ4 may be an angle such that the hemisphere 402e1 of the protrusion 402a1 and the hemisphere 402e2 of the protrusion 402a2 projected on the XZ plane are not aligned with the tangent line of the circle centered on the rotation center axis P. The driving force in the tangential direction required for the rotational driving decreases as the angle θ4 increases, and thus may be properly set as necessary.

Fifth Embodiment

Figure 17:
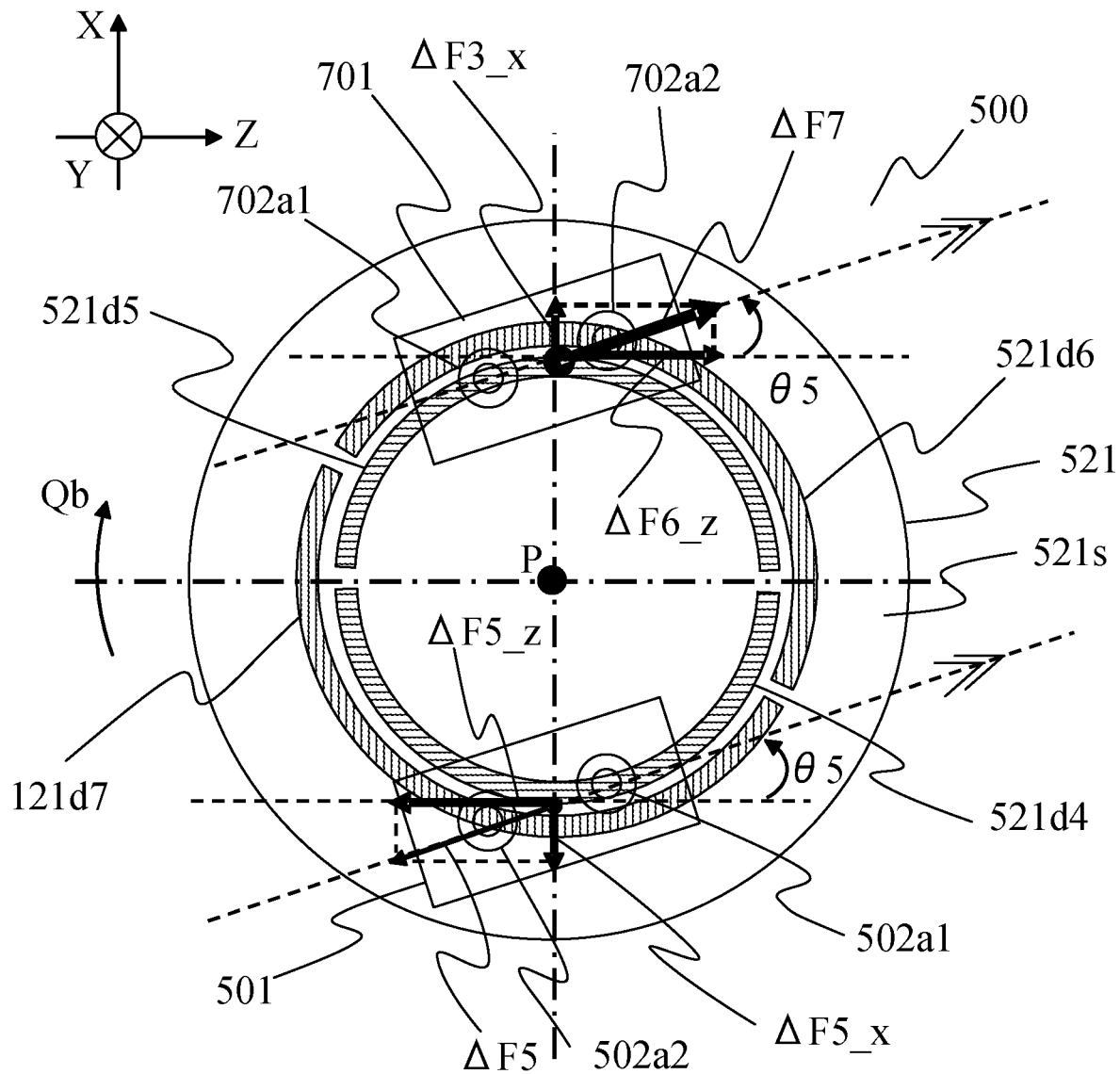
FIG. 17 illustrates a contact area and a driving force between a vibrator and a friction member in a vibration type motor according to a fifth embodiment.

FIG. 17 illustrates a vibration type motor 500 according to a fifth embodiment to which the vibration type motor 400 according to the fourth embodiment is applied. The fifth embodiment has a configuration that reduces a difference in the driving force component in the X direction depending on the rotating direction described in the fourth embodiment. A description of elements in this embodiment will be omitted, if they are corresponding elements of the vibration type motor 400 according to the fourth embodiment.

FIG. 17 illustrates driving forces generated by the first and second vibrators 501 and 701 and contact areas in a contact surface 521s on the friction member 521 with the first and second vibrators 501 and 701 provided in the vibration type motor 500 according to this embodiment.

The first and second vibrators 501 and 701 are arranged opposite to each other with respect to the rotation center axis P viewed from the Y direction, and both have the same shape as the vibrator 401 according to the fourth embodiment and the same attitude relative to the friction member 521. θ5 is a rotating angle of the first and second vibrators 501 and 701 in this embodiment around the axis corresponding to the axis U described in the fourth embodiment.

A rotationally driving range of the friction member 521 in the vibration type motor 500 is ±180 degrees. A protrusion 502a1 of the first vibrator 501 contacts a contact area 521d4 in the contact surface 521s, and a protrusion 502a2 contacts a contact area 521d7 in the contact surface 521s. A protrusion 702a1 of the second vibrator 701 contacts a contact area 521d5 in the contact surface 521s, and a protrusion 702a2 contacts a contact area 521d6 in the contact surface 521s. These four contact areas do not overlap each other in the rotationally driving range of the friction member 521. Therefore, the vibration type motor 500 according to this embodiment has a configuration that is less likely worn than the vibration type motor 100 according to the first embodiment in which the contact areas of the two protrusions overlap each other, like the vibration type motor 400 according to the fourth embodiment.

Where the rotating direction of the friction member 521 is Qb, the vibrator 501 generates a driving force of ΔF5 per unit time. ΔF5 is decomposed into ΔF5_z in the Z direction parallel to the tangential direction of the circle centered on the rotation center axis P and ΔF5_x in the X direction orthogonal to the Z direction. ΔF5_x acts in the −X direction.

On the other hand, where the rotating direction of the friction member 521 is Qb, the vibrator 701 generates a driving force of ΔF7 per unit time in the direction opposite to that of the vibrator 501. ΔF7 is decomposed into ΔF7_z in the Z direction and ΔF7_x in the ZX direction, and ΔF7_x acts in the +X direction. For smooth rotational drive, the driving forces generated by the two vibrators 501 and 701 may be equal, that is, ΔF7 and ΔF5 may be equal to each other. In this case, ΔF5_x and ΔF7_x have the same magnitudes and work in opposite directions, so that they cancel each other out. This is similarly applied when the rotating direction is opposite to that of Qb.

Thus, this embodiment configures the vibration type motor 500 such that the contact areas in which the two protrusions of the plurality of vibrators contact the friction member are different from each other (do not overlap each other), and the driving force components that are not used for the rotational driving among the driving forces generated by the vibrators cancel each other out. This configuration restrains the above skidding, delays the abrasion, and maintains smooth rotational driving regardless of the rotating direction.

The configurations of the vibration type motors 400 and 500 described in the fourth and fifth embodiments are applicable not only to the vibration type motor 100 according to the first embodiment but also to the vibration type motor 200 according to the second embodiment.

When the vibration type motor according to each embodiment is mounted as a rotationally driving apparatus for various devices such as an image pickup apparatus, the base member 122 may be fixed onto an apparatus body, and the driven member for rotationally driving the friction member 121 may be connected. The friction member 121 may be fixed onto the apparatus body and the base member 122 may be connected to the driven member. That is, the vibrator 101 and the friction member 121 may be rotated relative to each other and the driven member may be rotationally driven. In addition to the image pickup apparatus, the various devices include a laser beam irradiation device, a robot arm, and the like.

Sixth Embodiment

Figure 18:
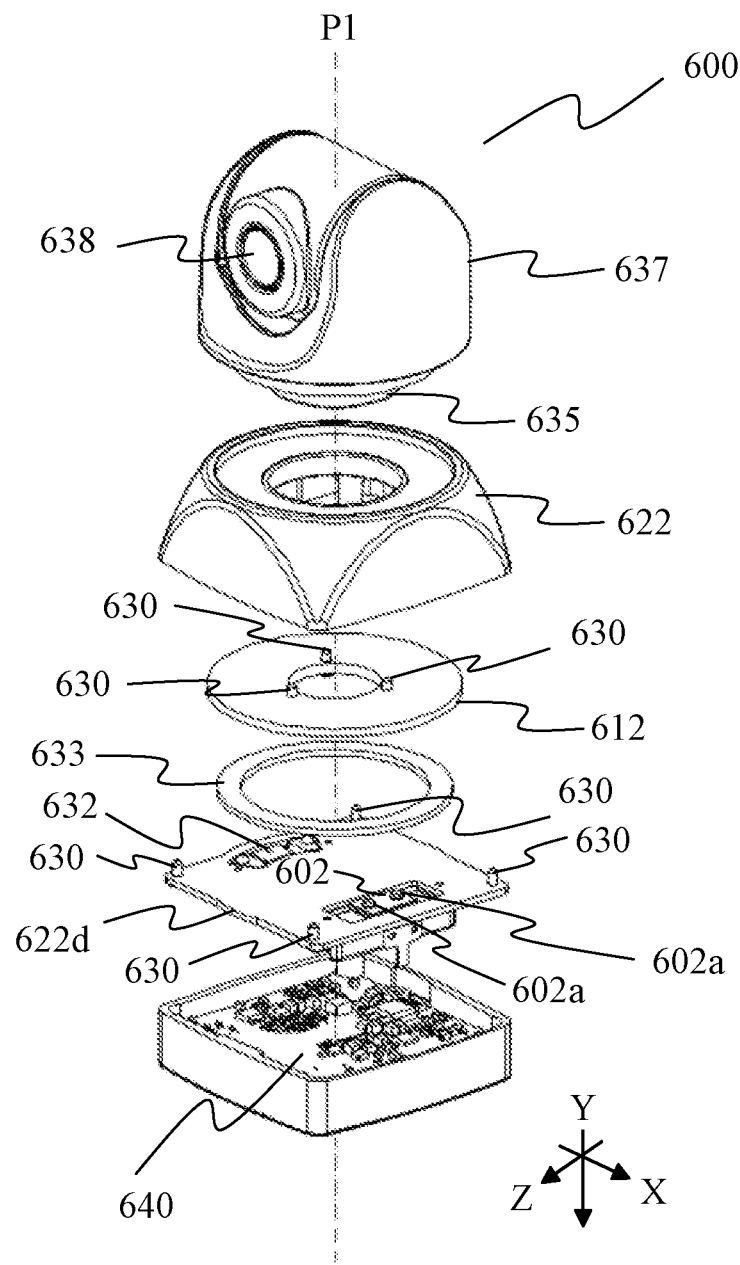
FIG. 18 is an exploded perspective view of an image pickup apparatus according to a sixth embodiment.
Figure 19:
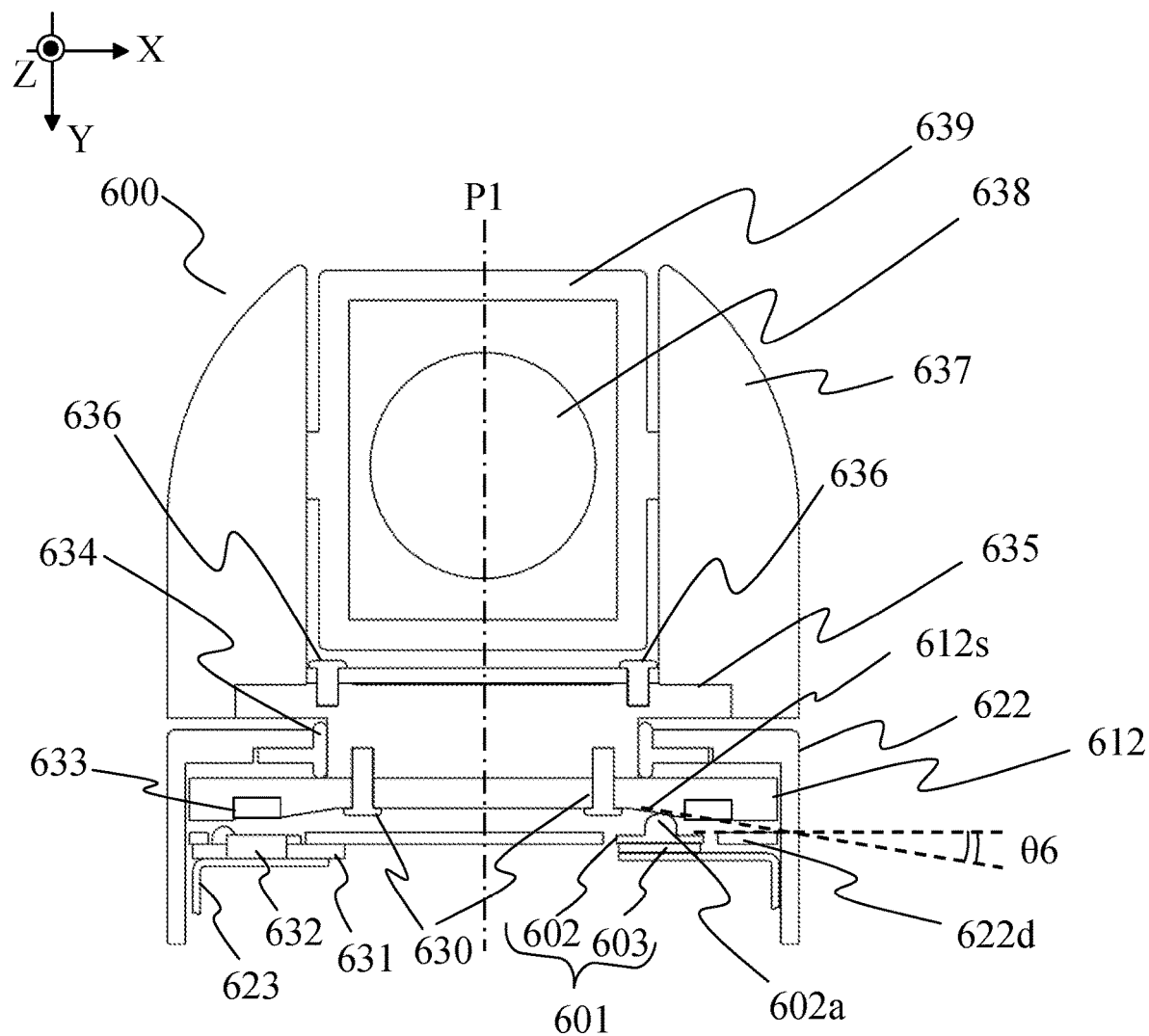
FIG. 19 is a sectional view of the image pickup apparatus according to the sixth embodiment.

Referring now to FIGS. 18 and 19, a description will be given of an image pickup apparatus 600 according to a sixth embodiment of the present invention. FIG. 18 is an exploded perspective view of the image pickup apparatus 600, and FIG. 19 is a sectional view of the image pickup apparatus 600 in an XY plane passing through a rotation center axis P1 described later.

The image pickup apparatus 600 is made by mounting an image pickup unit 637 provided with a lens barrel 638 onto a friction member 121 as a driven member of the vibration type motor 100 according to the first embodiment. Therefore, a description of elements will be omitted, if they are corresponding elements of the vibration type motor 100. The image pickup unit 637 is rotatable around the rotation center axis P1 relative to a base member 622 that holds a vibrator 601 described later. In addition, instead of the vibration type motor 100 according to the first embodiment, the vibration type motors 200, 300, 400, and 500 according to the second to fifth embodiments may be used.

The image pickup unit 637, which is the driven member of the image pickup apparatus 600, internally supports a holding frame 669 that holds a lens barrel 638, and is fixed onto a connecting member 635 by fastening screws 636. The connecting member 645 is fixed onto the friction member 612 by fastening screws 630. The friction member 612 holds a position detecting scale 633. The scale 633 has a texture radially engraved at regular intervals on a surface facing a position detecting sensor 632 described later. The position detecting sensor 632 can calculate a rotating amount of the driven unit by sequentially reading and integrating the texture of the scale 633.

A description will now be given of the configuration on the fixed side of the driven unit. The fixed side is mainly fixed onto a base member 422 around the position detecting sensor 632 described above, around the vibrator 601 that generates a driving force, and on an electronic substrate 640 described later.

The position detecting sensor 632 is held by a sensor holding frame 631 and is fixed onto a chassis 622d via a press member 623 at a position facing the scale 633. The chassis 622d is fixed to the base member 622 by fastening the screws 630.

The electronic board 640 is equipped with a microcomputer or the like for processing a signal from the position detecting sensor 632 and for controlling the rotational driving of the driven unit.

The vibrator 601 includes a plate-shaped elastic member 602 having two protrusions 602a and a piezoelectric element 603, and is held by the chassis 622d via an unillustrated frame member like the vibration type motor 100. The vibrator 601 is pressurized in the −Y axis direction by an unillustrated pressurizing mechanism, and is brought into pressure contact with a contact surface (friction surface) 612s of the friction member 612. At this time, the contact surface 612s is formed on the friction member 612 in an attitude having an angle of θ6 around the axis parallel to the Z axis relative to the vibrator 601.

The base member 622 is provided with a bearing member 634 between the base member 622 and the connecting member 635 which is a driven member.

Due to the above configuration, when an AC voltage is applied to the piezoelectric element 603, a driving force is generated between the protrusion 602a and the contact surface 612s, and the image pickup unit 637 fixed to the friction member 612 is rotationally driven around the rotation center axis P1.

As described above, the vibrator 601 and the contact surface 612s have the angle of θ6 around the axis parallel to the Z axis, and the configuration illustrated in FIG. 7D is adopted. Therefore, as in the first to fifth embodiments, there is an effect of suppressing skidding caused by rotational driving and of reducing a loss of the driving force and abrasion of the vibrator 601.

The contact surface 612s may tilt to the outside in the radial direction as illustrated in FIG. 7C, but in order to prevent abrasion powder from adhering to the scale 633 and the position detecting sensor 632 used to detect the position of the driven member, the contact surface 612s may tilt to the inside in the radial direction like this embodiment.

Each of the above embodiment can suppress skidding of the driven member relative to the vibrator in the vibration type actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2020-145156, filed on Aug. 31, 2020, 2021-049358, filed on Mar. 24, 2021, and 2021-111913, filed on Jul. 6, 2021 which are hereby incorporated by reference herein in their entirety.

What is claimed is:

1. A vibration type actuator comprising:
   a vibrator, including a protrusion and a piezoelectric element, that is arranged to vibrate in response to a voltage; and a contact member having a contact surface which the protrusion contacts, wherein the vibrator and the contact member rotate relative to each other around a first axis, and wherein the vibrator is tilted to the contact surface by a predetermined angle.

2. The vibration type actuator according to claim 1, wherein the vibrator is pressurized against the contact surface such that a pressure is applied to the vibrator in a direction disposed at the predetermined angle to the contact surface.

3. The vibration type actuator according to claim 1, wherein one of the vibrator and the contact surface is tilted to the other around a tangential axis tangential to the rotation.

4. The vibration type actuator according to claim 3, wherein one of the vibrator and the contact surface is tilted to a first plane orthogonal to the first axis around the tangential axis.

5. The vibration type actuator according to claim 4, wherein the vibrator is tilted to the contact surface parallel to the first plane around the tangential axis.

6. The vibration type actuator according to claim 5, further comprising an attitude determining member configured to hold the vibrator in an attitude that is tilted to the contact surface around the tangential axis.

7. The vibration type actuator according to claim 6, further comprising a pressurizing mechanism configured to pressurize the vibrator against the contact surface, wherein the attitude determining member is configured to hold the vibrator and the pressurizing mechanism in the attitude.

8. The vibration type actuator according to claim 7, further comprising a pressure transmitting member configured to receive a pressure from the pressurizing mechanism and to transmit the pressure to the vibrator, wherein the pressure transmitting member is used as the attitude determining member.

9. The vibration type actuator according to claim 8, wherein the pressurizing mechanism includes a movable member movable by the pressure, wherein the pressure transmitting member includes two contact members that contact the movable member, and wherein the two contact members have thicknesses different from each other.

10. The vibration type actuator according to claim 4, wherein the contact surface is tilted to the vibrator which is held parallel to the first plane.

11. The vibration type actuator according to claim 1, wherein the protrusion has a curved surface, which point-contacts the contact surface.

12. The vibration type actuator according to claim 1, wherein the vibrator includes, as the protrusion, a first protrusion and a second protrusion, and wherein a distance from the first axis to the first protrusion and a distance from the first axis to the second protrusion are different from each other when viewed from an extending direction of the first axis.

13. The vibration type actuator according to claim 12, further comprising, as the vibrator, a first vibrator having the first protrusion and a second vibrator having the second protrusion, respectively, wherein the first vibrator and the second vibrator are disposed so that contact areas on the contact surface where the first and second protrusions contact do not overlap each other.

14. The vibration type actuator according to claim 1, wherein when the vibration is propagated to the vibrator, a driving force is generated between the protrusion and the contact surface in a first direction in which a tangent of a circle centered on the first axis extends.

15. A rotationally driving apparatus comprising:

a vibration type actuator; and a driven member rotationally driven by the vibration type actuator, wherein the vibration type actuator includes:

a vibrator, including a protrusion and a piezoelectric element, that is arranged to vibrate in response to a voltage; and a contact member having a contact surface which the protrusion contacts, wherein the vibrator and the contact member rotate relative to each other around a first axis, and wherein the vibrator is tilted to the contact surface by a predetermined angle.

16. An image pickup apparatus comprising:

a rotationally driving apparatus; and an imaging unit as the driven member, wherein the rotationally driving apparatus includes:

a vibration type actuator; and a driven member rotationally driven by the vibration type actuator, wherein the vibration type actuator includes:

a vibrator, including a protrusion and a piezoelectric element, that is arranged to vibrate in response to a voltage; and a contact member having a contact surface which the protrusion contacts, wherein the vibrator and the contact member rotate relative to each other around a first axis, and wherein the vibrator is tilted to the contact surface by a predetermined angle.

* * * * *